US012783168B2

(12) United States Patent
Nakanishi et al.

(10) Patent No.: US 12,783,168 B2
(45) Date of Patent: Nov. 3, 2026

(54) APPARATUS, MEMORY SYSTEM, AND INFORMATION PROCESSING SYSTEM SIGNALING TERMINATION OF DATA DECOMPRESSION AND DATA DECRYPTION

(71) Applicant: Kioxia Corporation, Tokyo (JP)

(72) Inventors: Keiri Nakanishi, Kawasaki (JP); Hiroshi Koguchi, Kawasaki (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 19/077,288

(22) Filed: Mar. 12, 2025

(65) Prior Publication Data

US 2026/0056879 A1 Feb. 26, 2026

(30) Foreign Application Priority Data

Aug. 20, 2024 (JP) ................................ 2024-138480

(51) Int. Cl.
*G06F 3/06* (2006.01)

(52) U.S. Cl.
CPC .......... *G06F 3/0656* (2013.01); *G06F 3/0613* (2013.01); *G06F 3/0679* (2013.01)

(58) Field of Classification Search
CPC ..... G06F 3/0613; G06F 3/0656; G06F 3/0679
See application file for complete search history.

(56) References Cited

U.S. PATENT DOCUMENTS 10,444,991 B1 * 10/2019 Lu ......................... G06F 3/0656
2021/0144226 A1 5/2021 De Icaza Amozurrutia
2024/0111587 A1 * 4/2024 Horgan ................. G06F 9/5027

OTHER PUBLICATIONS

Tanaka et al., "The Latest Trends in Stream Ciphers—Security Technology for Ubiquitous Information Society—", IPSJ Magazine, vol. 47, No. 12, Dec. 2006, 25 pages including English Translation.

* cited by examiner

*Primary Examiner* — Chie Yew
(74) *Attorney, Agent, or Firm* — XSENSUS LLP

(57) ABSTRACT

A data decompression apparatus includes a read control circuit, a decompression circuit, and a write control circuit. The read control circuit reads compressed data stored in a first storage area starting from a first address in a random access memory. The decompression circuit decompresses the compressed data in an order from a head to generate decompressed data. The write control circuit, in response to receiving first information specifying data portions to be stored in the random access memory and a second address from the host: transfers the data portions specified in the first information to a second storage area starting from the second address, and outputs a signal indicating that transfer has been completed to the read control circuit. In response to the signal output from the write control circuit, the read control circuit performs control to stop reading the compressed data stored in the first storage area.

20 Claims, 13 Drawing Sheets

APPARATUS, MEMORY SYSTEM, AND INFORMATION PROCESSING SYSTEM SIGNALING TERMINATION OF DATA DECOMPRESSION AND DATA DECRYPTION

CROSS-REFERENCE TO RELATED APPLICATION

This application is based upon and claims the benefit of priority from Japanese Patent Application No. 2024-138480, filed Aug. 20, 2024, the entire contents of which are incorporated herein by reference.

FIELD

Embodiments described herein relate generally to techniques for decompressing or decrypting data.

BACKGROUND

A data compression unit is a unit in which data is compressed independently of other data. In a particular compression scheme, when the compression unit is increased, the amount of data that can be referenced in compression processing increases. Such a particular compression scheme refers to a compression scheme that compresses data sequentially from the head, such as lexicographic compression. Therefore, increasing the compression unit can improve the data compression efficiency.

However, in the case of acquiring a portion of decompressed data obtained by decompressing compressed data, a large compression unit can lead to a waste of the bandwidth of a random access memory (RAM) in which the compressed data and the decompressed data are stored. The bandwidth of the RAM is the data transfer capacity of the transmission path between the RAM and external elements. An external element is, for example, a data decompression apparatus that decompresses compressed data.

Further, the same can be said in the case of acquiring a portion of decrypted data obtained by decrypting encrypted data. This encrypted data is data encrypted with an encryption scheme that encrypts data sequentially from the head, such as stream cipher.

DETAILED DESCRIPTION

In various embodiments of the present disclosure, there are provided a data decompression apparatus, a memory system, an information processing system, and a data decryption apparatus that can efficiently use the bandwidth of a RAM when decompressing compressed data or decrypting encrypted data.

In general, according to one embodiment, a data decompression apparatus is connectable to a host. The data decompression apparatus includes a read control unit, a decompression unit, and a write control unit. In response to receiving a first address from the host, the read control unit causes compressed data stored in a first storage area starting from the first address in a random access memory to be transferred to the data decompression apparatus. The decompression unit decompresses the transferred compressed data in order from a head to generate decompressed data. In response to receiving first information specifying one or more data portions to be stored in the random access memory in the generated decompressed data and a second address from the host, the write control unit transfers the one or more data portions specified in the first information to a second storage area starting from the second address in the random access memory. The write control unit outputs a signal indicating that transfer of the one or more data portions has been completed to the read control unit. The read control unit performs control so as to stop reading the compressed data stored in the first storage area in response to receiving the signal.

Hereinafter, embodiments will be described with reference to the drawings.

Figure 1:
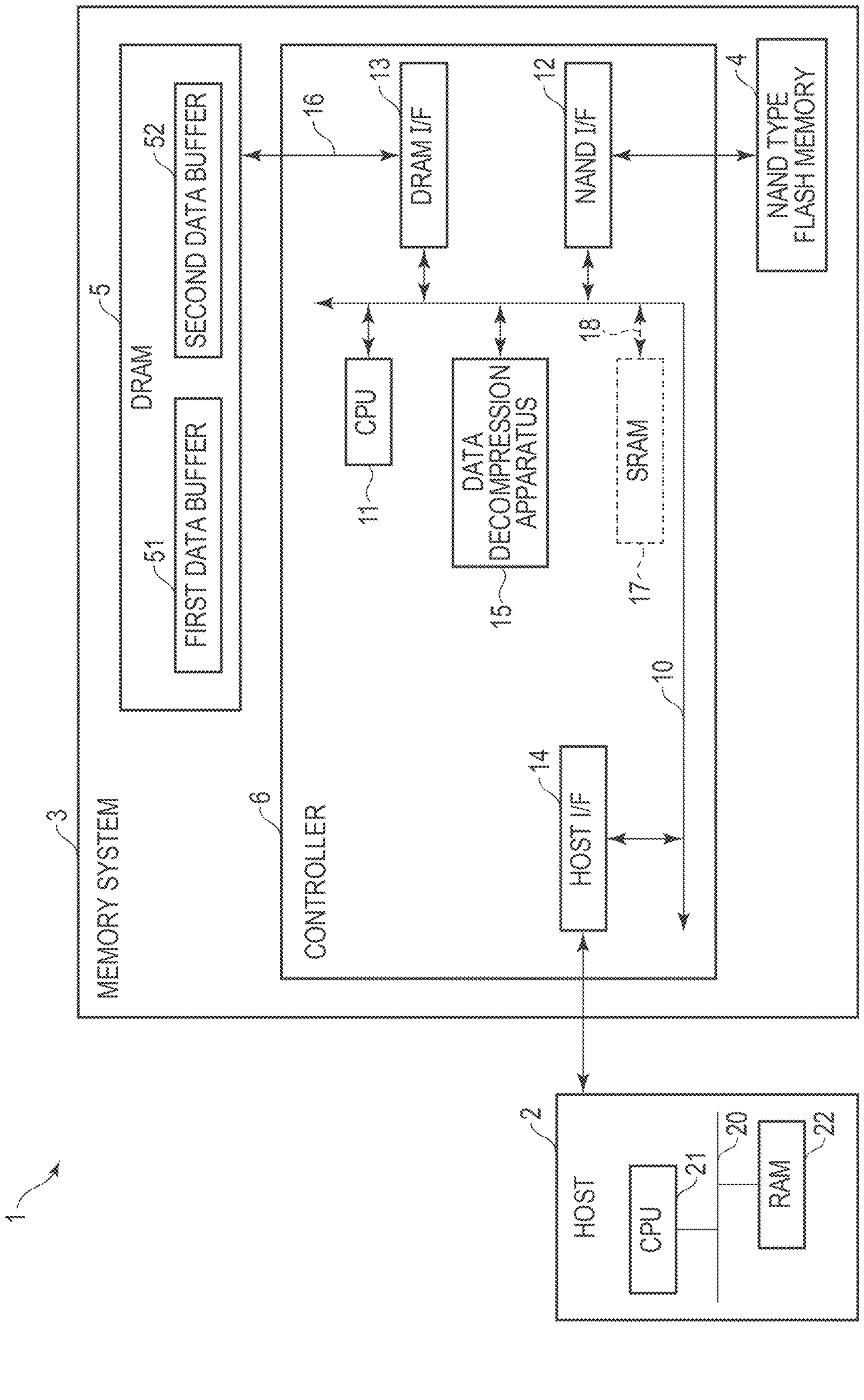
FIG. 1 is a block diagram illustrating a configuration example of an information processing system including a data decompression apparatus.

FIG. 1 shows a configuration example of an information processing system including a data decompression apparatus. An information processing system 1 includes a host device 2 and a memory system 3.

The host device 2 is an information processing apparatus that stores data in the memory system 3. The host device 2 is, for example, a storage server that stores a large amount and variety of data in the memory system 3, or a personal computer. Hereinafter, the host device 2 will be referred to as the host 2.

The memory system 3 is a semiconductor storage device configured to write data to a non-volatile memory and read data from the non-volatile memory. The non-volatile memory is, for example, a NAND type flash memory 4. The memory system 3 is implemented, for example, as a solid-state drive (SSD). Hereinafter, a case where the memory system 3 is implemented as an SSD will be described as an example. Note that the memory system 3 may be implemented as another type of storage device such as a hard disk drive (HDD).

The memory system 3 may be used as storage for the host 2. The memory system 3 may be built in the host 2 or may be connected to the host 2 via a cable or a network.

An interface for connecting the host 2 to the memory system 3 conforms to a standard such as SCSI, Serial Attached SCSI (SAS), ATA (AT Attachment), Serial ATA (SATA), PCI Express™ (PCIe™), Ethernet™, Fibre channel, and NVM Express™ (NVMe™).

The memory system 3 includes, for example, the NAND type flash memory 4, a dynamic random access memory (DRAM) 5, and a controller 6.

The NAND type flash memory 4 includes one or more memory chips. Each memory chip includes a plurality of blocks. One block serves as the smallest unit for a data erasing operation. A block is also referred to as an erase block or a physical block. Each of the plurality of blocks includes a plurality of pages. Each of the plurality of pages includes a plurality of memory cells connected to a single word line. One page serves as a unit for a data writing operation and a data reading operation. Note that the word line may serve as a unit for a data writing operation and a data reading operation.

The number of program/erase cycles (the number of P/E cycles) for each block has an upper limit, which is referred to as the maximum number of P/E cycles. One P/E cycle for a block includes an erasing operation for putting all memory cells in this block into an erased state and a writing operation for writing data to each page of this block.

The DRAM 5 is a volatile memory. A storage area in the DRAM 5 is allocated as, for example, a storage area for firmware (FW), a cache area for a logical/physical address translation table, and a buffer area for user data. Here, the user data is data for the host 2 to store in the memory system 3, and is write data transmitted from the host 2.

At least a partial storage area in the DRAM 5 may be utilized by the host 2 as a buffer area. Specifically, for example, when issuing a command to the memory system 3, the host 2 may specify an address in the buffer area (i.e., an address in the DRAM 5) where data acquired in response to the command is stored. In this case, the data acquired in response to the command is stored in a storage area in the DRAM 5 starting from the specified address. Further, the host 2 can read data from the buffer area and transfer it to the host 2. Such utilization of the DRAM 5 by the host 2 is realized, for example, by using at least a partial storage area in the DRAM 5 as a controller memory buffer (CMB) defined in NVMe. The storage area in the DRAM 5 used as the CMB is a storage area available to the host 2.

Further, at least partial storage areas in the DRAM 5 are allocated, for example, as a first data buffer 51 and a second data buffer 52.

The first data buffer 51 is a storage area for storing compressed data. The head address of the first data buffer 51 in the storage area of the DRAM 5 is specified, for example, by the host 2. Furthermore, the size of the first data buffer 51 may also be specified by the host 2. Compressed data stored in the first data buffer 51 is, for example, compressed data read from the NAND type flash memory 4. Alternatively, compressed data stored in the first data buffer 51 may be compressed data transferred from the host 2.

The second data buffer 52 is a storage area for storing decompressed data (uncompressed data) obtained by decompressing compressed data. The decompressed data is, for example, user data. The head address of the second data buffer 52 in the storage area of the DRAM 5 is specified by, for example, the host 2. Furthermore, the size of the second data buffer 52 may also be specified by the host 2.

The DRAM 5 and the controller 6 are connected via a transmission path 16. The transmission path 16 is a physical transmission medium for transmitting data. The transmission path is also referred to as the communication path. Specifically, data read from the DRAM 5 is transferred from the DRAM 5 via the transmission path 16. Further, data written to the DRAM 5 is transferred to the DRAM 5 via the transmission path 16. The capacity of data that can be transmitted by the transmission path 16 (the data transfer capacity) is referred to as the bandwidth of the DRAM 5.

The controller 6 is a memory controller that controls the NAND type flash memory 4 and the DRAM 5. The controller 6 is implemented by a circuit such as a System-on-a-chip (SoC).

The controller 6 functions as, for example, a flash translation layer (FTL) configured to execute data management and block management of the NAND type flash memory 4. The data management performed by this FTL includes (1) management of mapping information indicating the correspondence between logical addresses and respective physical addresses in the NAND type flash memory 4, and (2) processing for hiding the differences between page-by-page data reading operation/data writing operation and block-by-block data erasing operation. The block management includes bad block management, wear leveling, and garbage collection.

A logical address is used by the host 2 to address a storage area in the memory system 3. A logical address is, for example, a logical block address (LBA).

Management of mapping between logical addresses and respective physical addresses is performed, for example, using a logical/physical address translation table. The controller 6 manages mapping information between logical addresses and respective physical addresses in a specific management size unit using the logical/physical address translation table. The physical address corresponding to a certain logical address indicates a physical storage position in the NAND type flash memory 4 to which user data at this logical address is written. The logical/physical address translation table may be loaded from the NAND type flash memory 4 to the DRAM 5 when the memory system 3 is started.

Data can be written to one page only once per P/E cycle. Therefore, the controller 6 writes update user data corresponding to a logical address to another physical storage position instead of the physical storage position where the previous user data corresponding to this logical address is stored. Then, the controller 6 invalidates the previous user data by updating the logical/physical address translation table to associate this logical address with this other physical storage position.

The controller 6 includes, for example, a CPU 11, a NAND interface (NAND I/F) 12, a DRAM interface (DRAM I/F) 13, a host interface (host I/F) 14, and a data decompression apparatus 15. The CPU 11, the NAND I/F

12, the DRAM I/F 13, the host I/F 14, and the data decompression apparatus 15 are connected, for example, via a bus 10.

Note that the controller 6 may have a static random access memory (SRAM) 17 or a DRAM built therein. In this case, the DRAM 5 external to the controller 6 may not be provided.

The SRAM 17 is a volatile memory. A storage area in the SRAM 17 may be allocated as at least one of, for example, a storage area for FW, a cache area for the logical/physical address translation table, and a buffer area for user data. Further, storage areas in the SRAM 17 may be allocated as the first data buffer 51 and the second data buffer 52.

The SRAM 17 and each component in the controller 6 are connected via a transmission path 18. Specifically, data read from the SRAM 17 is transferred from the SRAM 17 via the transmission path 18. Further, data written to the SRAM 17 is transferred to the SRAM 17 via the transmission path 18. The data transfer capacity of the transmission path 18 is referred to as the bandwidth of the SRAM 17.

Hereinafter, a case where storage areas in the DRAM 5 are allocated as the first data buffer 51 and the second data buffer 52 will mainly be described as an example. Note that the DRAM 5 in the following description may be replaced with another RAM in the memory system 3, such as the SRAM 17.

The CPU 11 is a processor configured to control the NAND I/F 12, the DRAM I/F 13, the host I/F 14, and the data decompression apparatus 15. The CPU 11 performs various processes by executing the FW loaded into the DRAM 5 from the NAND type flash memory 4. The FW is a control program that includes a set of instructions for causing the CPU 11 to execute various processes. In addition to the above-described FTL processing, the CPU 11 executes command processing for processing various commands from the host 2. The operation of the CPU 11 is controlled by the FW executed by the CPU 11. Note that a part or the whole of the FTL processing and the command processing may be executed by dedicated hardware in the controller 6.

The NAND I/F 12 electrically connects the controller 6 and the NAND type flash memory 4. The NAND I/F 12 supports interface standards such as Toggle DDR and Open NAND Flash Interface (ONFI).

The NAND I/F 12 functions as a NAND control circuit configured to control the NAND type flash memory 4. The NAND I/F 12 may be connected to a plurality of memory chips in the NAND type flash memory 4 via a plurality of respective channels. By driving the plurality of memory chips in parallel, it is possible to broaden the bandwidth for access to the entire NAND type flash memory 4.

The DRAM I/F 13 functions as a DRAM control circuit configured to control the access to the DRAM 5.

The host I/F 14 is a circuit that functions as an interface for communication between the memory system 3 and the host 2. The host I/F 14 includes a circuit that receives various commands (e.g., input/output (I/O) commands and control commands) from the host 2. An I/O command is, for example, a read command or a write command. A control command is, for example, an unmap command (a trim command) or a format command. The host I/F 11 includes a circuit that transmits responses and data in response to commands to the host 2.

The data decompression apparatus 15 is a decompressor that decompresses compressed data. Compressed data is, for example, data transmitted from the host 2 to the memory system 3 or data read from the NAND type flash memory 4. For example, the CPU 11 stores compressed data read from the NAND type flash memory 4 in response to receiving a read command from the host 2 in the DRAM 5 (e.g., the first data buffer 51). The data decompression apparatus 15 reads compressed data stored in the DRAM 5, and decompresses the read compressed data to generate decompressed data.

The data decompression apparatus 15 decompresses compressed data for each compression unit. A compression unit is a unit of data compressed at one time. Dependency such as reference to a data portion is closed within data of a compression unit. That is, it is not possible to refer to a data portion that exceeds the compression unit. Thus, a compression unit is a unit in which data is compressed independently of other data. In a particular compression scheme, when the compression unit is increased, the amount of data that can be referenced in compression processing increases, and the data compression efficiency can be improved. A particular compression scheme is a compression scheme that compresses data sequentially from the head, such as lexicographic compression.

Here, a data decompression apparatus according to a comparative example is used to describe the data transfer amount between the data decompression apparatus and the DRAM.

Figure 2:
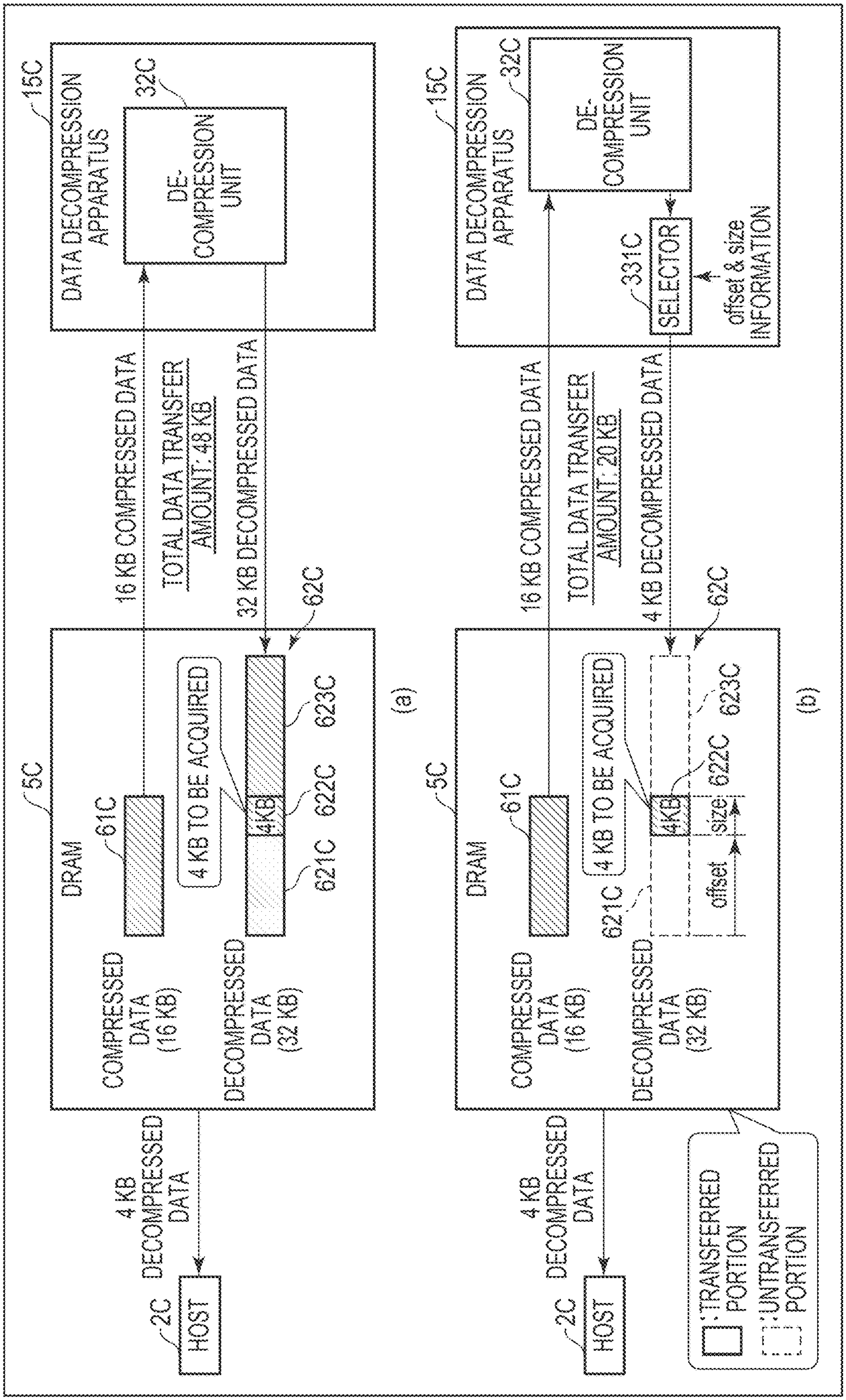
FIG. 2 shows diagrams illustrating the data transfer amount between a data decompression apparatus and a RAM according to a comparative example.

FIG. 2 shows diagrams illustrating the data transfer amount between a data decompression apparatus and a DRAM according to a comparative example. A data decompression apparatus 15C of the comparative example includes a decompression unit 32C. The decompression unit 32C decompresses compressed data 61C transferred from the DRAM 5C to generate decompressed data 62C. Here, it is assumed that the compression unit is 32 KB and the compression ratio is 2. 16 KB compressed data 61C is stored in the DRAM 5C. The 16 KB compressed data 61C is data obtained by compressing plaintext data of the compression unit (32 KB) at the compression ratio of 2. Note that in FIG. 2, the data actually stored in the DRAM 5C is shown by a pattern of diagonal lines.

Here, consider a case where the host 2C is to acquire only an intermediate 4 KB partial area 622C in the 32 KB decompressed data 62C obtained by decompressing the 16 KB compressed data 61C. Two examples of the data transfer amount between the data decompression apparatus 15C and the DRAM 5C in this case will be described.

In the example shown in the part (a) of FIG. 2, the entire 16 KB compressed data 61C is transferred to the decompression unit 32C in order from the head. Then, the decompression unit 32C transfers the entire 32 KB decompressed data 62C obtained by decompressing the 16 KB compressed data 61C to the DRAM 5C. After the 32 KB decompressed data 62C is transferred to the DRAM 5C, the host 2C (e.g., the CPU of the host 2C) accesses the 4 KB partial area 622C to be acquired.

In this case, the total data transfer amount between the data decompression apparatus 15C and the DRAM 5C is 48 KB (=16 KB+32 KB). That is, in the example shown in the part (a) of FIG. 2, not only the 4 KB partial area 622C to be acquired but also the partial areas 621C and 623C before and after it are transferred to the DRAM 5C. Therefore, since the partial areas 621C and 623C are transferred to the DRAM 5C, the bandwidth of the DRAM 5C is wasted.

In the example shown in the part (b) of FIG. 2, the entire 16 KB compressed data 61C is also transferred to the decompression unit 32C in order from the head, but the data decompression apparatus 15C further includes a selector 331C. The selector 331C selectively transfers only the specified partial area in the decompressed data 62C output from the decompression unit 32C to the DRAM 5C.

Specifically, the decompression unit 32C sequentially outputs decompressed data obtained by decompressing compressed data transferred from the DRAM 5C in order from the head to the selector 331C.

The selector 331C receives offset information and size information from the host 2. The offset information and the size information are information for identifying the 4 KB partial area 622C to be acquired. More specifically, the offset information indicates the relative position of the head of the partial area 622C to the head of the decompressed data 62C. The size information indicates the size of the partial area 622C (here, 4 KB).

The selector 331C transfers only the 4 KB partial area 622C in the decompressed data output from the decompression unit 32C to the DRAM 5C based on the offset information and the size information. That is, the selector 331C does not transfer the partial areas 621C and 623C before and after the partial area 622C to the DRAM 5C. In the part (b) of FIG. 2, the partial area 622C transferred to the DRAM 5C (a transferred portion) is shown by a solid line, and the partial areas 621C and 623C not transferred to the DRAM 5C (untransferred portions) are shown by dashed lines. In this case, the total data transfer amount between the data decompression apparatus 15C and the DRAM 5C is 20 KB (=16 KB+4 KB), which is reduced from the example shown in the part (a) of FIG. 2.

However, in the data decompression apparatus 15C of the comparative example shown in the part (b) of FIG. 2, compressed data 61C is continued to be transferred from the DRAM 5C to the decompression unit 32C even after the partial area 622C to be acquired is transferred to the DRAM 5C. Therefore, since compressed data that is not necessary for acquiring the partial area 622C is transferred from the DRAM 5C to the decompression unit 32C, the bandwidth of the DRAM 5C is wasted. Furthermore, if the compression unit is increased from the viewpoint of compression efficiency, the wasted bandwidth of the DRAM 5C increases more.

On the other hand, the data decompression apparatus 15 performs control so that the transfer of compressed data from the DRAM 5 to the data decompression apparatus 15 is stopped in response to the completion of transfer of the partial area to be acquired in the decompressed data to the DRAM 5. This makes it possible to reduce the data transfer amount between the data decompression apparatus 15 and the DRAM 5. That is, the data decompression apparatus 15 can suppress the bandwidth consumption of the DRAM 5 to the minimum necessary. Therefore, the data decompression apparatus 15 can efficiently use the bandwidth of the DRAM 5.

For example, it is assumed that a 4 KB partial area to be acquired appears uniformly at random in the 32 KB decompressed data. In this case, it is considered to be sufficient that a 4 KB partial area near the center of the 32 KB decompressed data is acquired on average. Therefore, a 4 KB partial area to be acquired in the decompressed data is obtained on average by decompressing the partial area in about half of the 16 KB compressed data from the head. Thus, the amount of compressed data transferred from the DRAM 5 to the data decompression apparatus 15 is about 8 KB on average. Therefore, the total data transfer amount between the data decompression apparatus 15 and the DRAM 5 can be reduced to about 12 KB (=8 KB+4 KB) by stopping transferring compressed data from the DRAM 5 to the data decompression apparatus 15 in response to the completion of transfer of the 4 KB partial area to be acquired to the DRAM 5.

Figure 3:
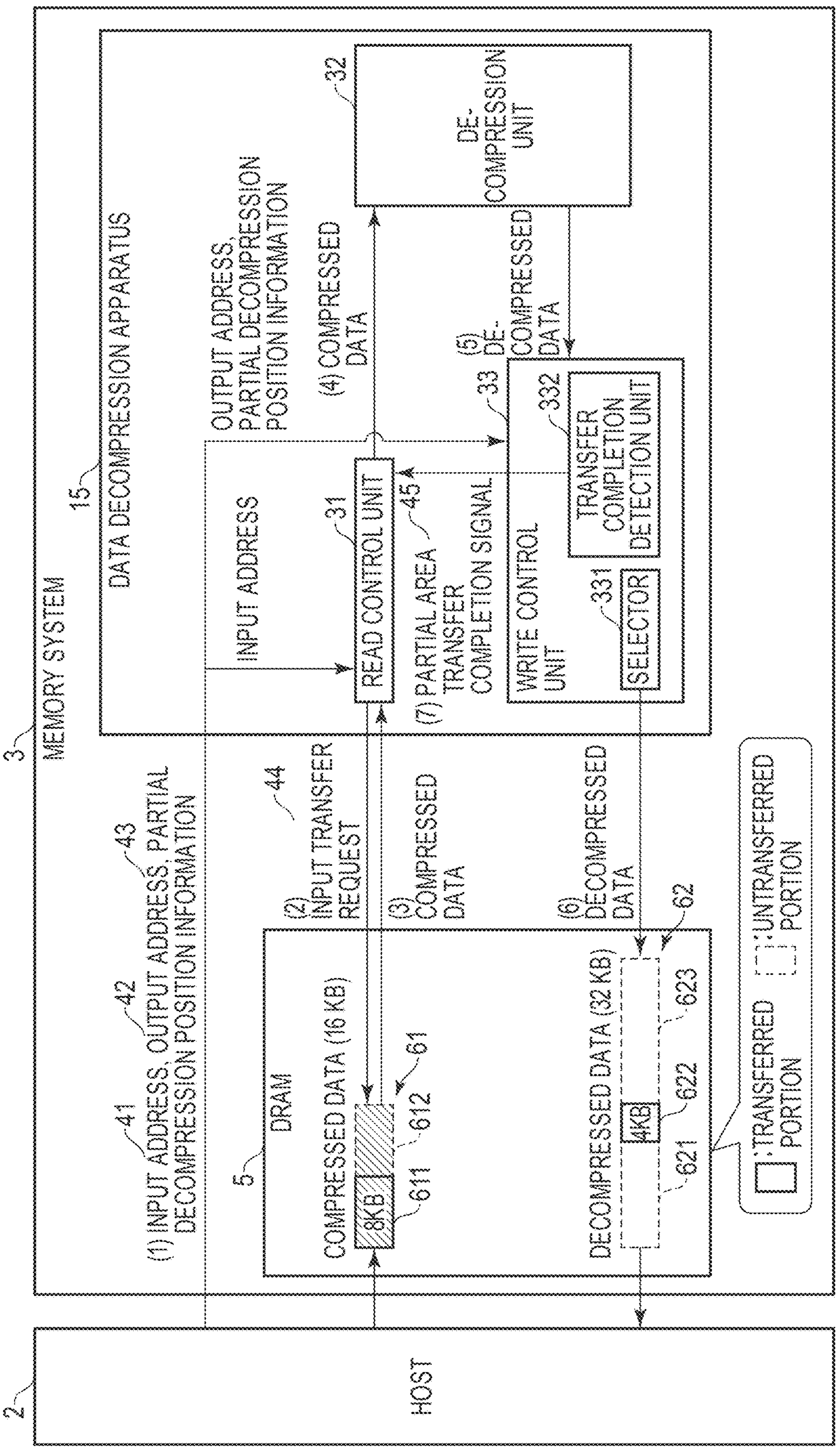
FIG. 3 is a block diagram illustrating an example of the configuration and operation of the data decompression apparatus of FIG. 1.

FIG. 3 is a block diagram illustrating an example of the configuration and operation of the data decompression apparatus 15.

The data decompression apparatus 15 may acquire information (data) transmitted by the host 2 via the host I/F 14, for example. The information transmitted by the host 2 includes, for example, an input address 41, an output address 42, and partial decompression position information 43.

The input address 41 is the head address of a storage area in the DRAM 5 in which compressed data 61 is stored. That is, the input address 41 indicates the head address of the first data buffer 51 in the DRAM 5. The compressed data 61 is stored in the first data buffer 51. In FIG. 3 and subsequent figures, data stored in the DRAM 5 is shown by a pattern of diagonal lines.

The output address 42 is the head address of a storage area in the DRAM 5 in which a portion of decompressed data 62 obtained by decompressing the compressed data 61 should be stored. That is, the output address 42 indicates the head address of the second data buffer 52 in the DRAM 5. The decompressed data 62 is data corresponding to data of the compression unit. In the second data buffer 52, a partial area 622 to be acquired by the host 2 in the decompressed data 62 is stored in order from the head.

The partial decompression position information 43 is information that specifies a partial decompression position to be acquired by the host 2 in the decompressed data 62. One partial decompression position represents one partial area 622 in the decompressed data 62.

Figure 4:
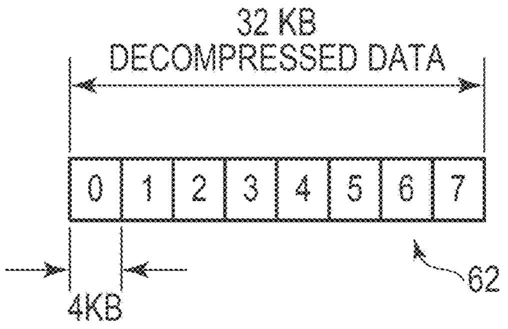
FIG. 4 is a diagram illustrating a configuration example of decompressed data for specifying a partial decompression position in the data decompression apparatus of FIG. 1.

FIG. 4 shows a configuration example of decompressed data 62 for specifying a partial decompression position.

The decompressed data 62 of the compression unit (i.e., uncompressed data of the compression unit) includes L data portions each having a first size. In other words, the first size is 1/L of the compression unit. Each of the L data portions is a data unit for specifying data to be acquired in the decompressed data 62. Hereinafter, a data portion of the first size included in the decompressed data 62 is also referred to as a decompressed data portion. For example, the L decompressed data portions are assigned respective numbers from 0 to (L−1) in order from the head. One partial decompression position representing one decompressed data portion 622 to be acquired by the host 2 may be specified, for example, using one of the numbers from 0 to (L−1).

In the example shown in FIG. 4, the compression unit is 32 KB and the first size is 4 KB. In this case, the decompressed data 62 includes eight decompressed data portions. That is, the decompressed data 62 includes the first to eighth decompressed data portions. The eight decompressed data portions are assigned respective numbers from 0 to 7 in order from the head. Thus, one partial decompression position (decompressed data portion 622) to be acquired by the host 2 may be specified, for example, using one of the numbers from 0 to 7.

Figure 5:
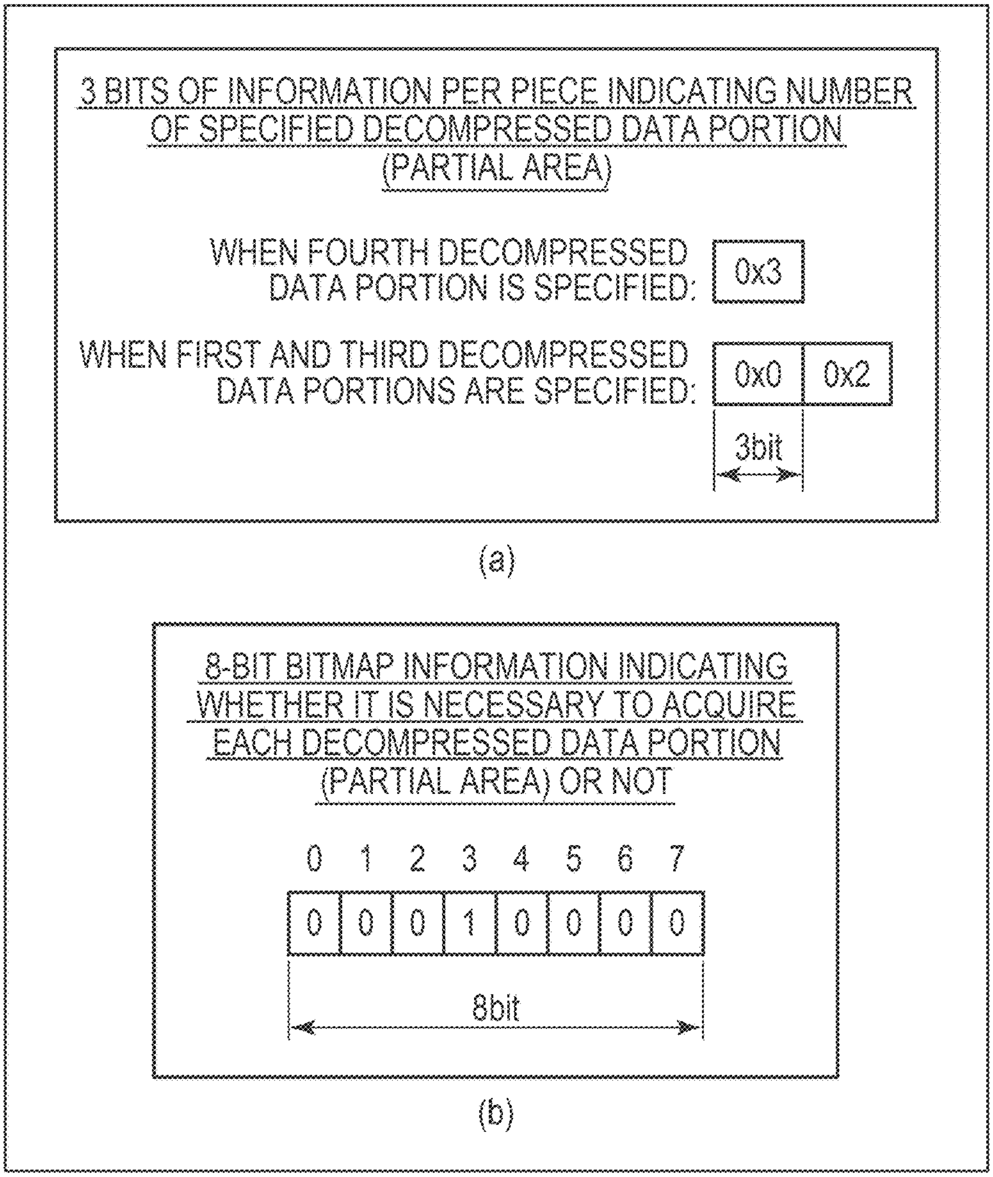
FIG. 5 shows diagrams illustrating: (a) a first example of partial decompression position information; and (b) a second example of partial decompression position information in the data decompression apparatus of FIG. 1.

Further, FIG. 5 shows (a) a first example of the partial decompression position information 43 and (b) a second example of the partial decompression position information 43 in the data decompression apparatus 15.

The partial decompression position information 43 may specify M partial decompression positions. The number M indicates a number of partial decompression positions is, for example, any integer from 1 to (L−1). The M partial decompression positions are arranged in the partial decompression position information 43, for example, in order of closeness of the corresponding decompressed data portion 622 to the head of the decompressed data 62.

As shown in the part (a) of FIG. 5, for example, the number indicating a decompressed data portion 622 is specified in the partial decompression position information 43. The decompressed data portion 622 to which the specified number is assigned is the decompressed data portion 622 to be acquired by the host 2. A number from 1 to (L−1) can be specified in the partial decompression position information 43.

When the decompressed data 62 includes eight decompressed data portions, the bit length of information specifying the number assigned to one decompressed data portion is 3 bits. Specifically, for example, when the fourth decompressed data portion from the head is specified as a decompressed data portion 622 to be acquired, the partial decompression position information 43 includes "0x3" indicating the number "3" assigned to the fourth decompressed data portion. In addition, for example, when the first and third decompressed data portions from the head are specified as decompressed data portions 622 to be acquired, the partial decompression position information 43 includes "0x0" and "0x2" indicating the numbers "0" and "2" assigned to these first and third decompressed data portions, respectively. Therefore, in the partial decompression position information 43, one to a maximum of seven decompressed data portions 622 to be acquired can be specified with 3 bits of information per decompressed data portion.

Alternatively, as shown in the part (b) of FIG. 5, the partial decompression position information 43 may be bitmap information indicating whether it is necessary to acquire each of the L decompressed data portions or not. The bit length of the bitmap information is L bits. Each bit of a bit string of L bits included in the bitmap information corresponds to a respective one of the L decompressed data portions. More specifically, each bit of the bit string of L bits corresponds to a respective one of the numbers from 0 to (L−1) assigned to the L decompressed data portion. In the bit string of L bits, for example, "1" is set to the bits corresponding to decompressed data portions 622 to be acquired. Further, for example, "0" is set to the bits corresponding to the decompressed data portions not to be acquired.

When the decompressed data 62 includes eight decompressed data portions, the partial decompression position information 43 is 8-bit bitmap information. For example, when the fourth decompressed data portion from the head is to be acquired and the other decompressed data portions are not to be acquired, "1" is set to the bit corresponding to the number "3" assigned to the fourth decompressed data portion from the head and "0" is set to the other 7 bits in the 8-bit bitmap information. That is, in this case, the partial decompression position information 43 is "8'b00010000". Note that the data string of bit values of 0 or 1 following "X'b" indicates a bit data string of X bits. In "8'b00010000", the most significant bit (MSB) corresponds to the first decompressed data portion (the decompressed data portion to which the number "0" is assigned), and the least significant bit (LSB) corresponds to the eighth decompressed data portion (the decompressed data portion to which the number "7" is assigned).

By receiving such partial decompression position information 43 from the host 2, the data decompression apparatus 15 can identify the decompressed data portions 622 (the partial decompression positions) to be acquired by the host 2.

Return to FIG. 3.

The data decompression apparatus 15 is configured to read data from the DRAM 5 and write data to the DRAM 5, for example, via the DRAM I/F 13. That is, the data decompression apparatus 15 is configured to control data transfer from the DRAM 5 and data transfer to the DRAM 5. Furthermore, the data decompression apparatus 15 is configured to decompress compressed data 61 read from the DRAM 5 in order from the head to generate decompressed data 62 in order from the head. When a decompressed data portion 622 to be acquired in the decompressed data 62 is specified in the partial decompression position information 43, the data decompression apparatus 15 performs control so that the transfer of the compressed data 61 from the DRAM 5 to the data decompression apparatus 15 is stopped in response to the completion of transfer of the decompressed data portion 622 to be acquired to the DRAM 5.

The data decompression apparatus 15 includes, for example, a read control unit 31, a decompression unit 32, and a write control unit 33. Components in the data decompression apparatus 15 such as the read control unit 31, the decompression unit 32, and the write control unit 33 are implemented by at least one of, for example, a register, a memory, an adder, a multiplier, a selector, and other arithmetic units. A register is implemented by a sequential circuit such as a flip-flop. A memory is implemented by a storage element such as an SRAM or a DRAM. An adder, a multiplier, a selector, and other arithmetic units are implemented, for example, by a combinatorial logic circuit.

The read control unit 31 is a circuit that controls the reading (transfer) of compressed data 61 from the DRAM 5. The read control unit 31 reads compressed data 61 from the DRAM 5 in order from the head, and sequentially outputs the read compressed data 61 to the decompression unit 32.

The decompression unit 32 is a circuit that sequentially decompresses the compressed data 61 received from the read control unit 31 to generate decompressed data 62. The decompression unit 32 generates the decompressed data 62 obtained by decompressing the compressed data 61 in order from the head. The decompression unit 32 sequentially outputs the generated decompressed data 62 to the write control unit 33.

The write control unit 33 is a circuit that controls the writing (transfer) of decompressed data 62 output by the decompression unit 32 to the DRAM 5 and the output of a partial area transfer completion signal 45 to the read control unit 31. The partial area transfer completion signal 45 is a signal that causes the read control unit 31 to stop reading compressed data 61 from the DRAM 5.

The write control unit 33 includes, for example, a selector 331 and a transfer completion detection unit 332. The selector 331 selectively writes only the decompressed data portion 622 specified by the host 2 in the decompressed data 62 output by the decompression unit 32 to the DRAM 5. The transfer completion detection unit 332 outputs the partial area transfer completion signal 45 to the read control unit 31 in response to the completion of writing of all the decompressed data portions 622 specified by the host 2 to the DRAM 5.

The operation of the read control unit 31, the decompression unit 32, and the write control unit 33 will be described more specifically. In the following, a case where the compression unit is 32 KB, the compression ratio is 2, and the size of one decompressed data portion (the first size) is 4 KB will mainly be described as an example. 16 KB compressed data 61 is stored in the DRAM 5. The 16 KB compressed data 61 is data obtained by compressing plaintext data of the compression unit (32 KB) at a compression ratio of 2. Decompressed data 62 obtained when the entire 16 KB compressed data 61 is decompressed is 32 KB data. The 32 KB decompressed data 62 includes eight 4 KB decompressed data portions. Thus, these eight 4 KB decompressed data portions are identified, for example, by eight respective partial decompression positions indicated by the numbers from 0 to 7. Here, it is assumed that the partial decompression position information 43 is "0x3", which specifies the decompressed data portion 622 corresponding to the fourth partial decompression position of the eight partial decompression positions.

The read control unit 31 and the write control unit 33 receive the input address 41, the output address 42, and the partial decompression position information 43 transmitted by the host 2 ((1) in FIG. 3). Specifically, the read control unit 31 receives the input address 41. Further, the write control unit 33 receives the output address 42 and the partial decompression position information 43.

The read control unit 31 transmits an input transfer request 44 to the DRAM 5 in order to read the compressed data 61 stored in the storage area (the first data buffer 51) starting from the input address 41 in the DRAM 5 in order from the head, for example, for each second size ((2) in FIG. 3). The input transfer request 44 is a request for causing the DRAM 5 to transfer a data portion of the second size included in the compressed data 61 (hereinafter also referred to as a compressed data portion) to the read control unit 31. The second size may be smaller than the compression unit and may also be smaller than the first size. The second size is a size configurable in any manner, such as 512 B (bytes) or 1 KB. The input transfer request 44 specifies, for example, the head address and size of a storage area in which a compressed data portion to be transferred is stored. For example, the input transfer request 44 first transmitted by the read control unit 31 to the DRAM 5 in order to read the compressed data 61 specifies the input address 41 and the second size.

The read control unit 31 receives the compressed data portion read in response to the transmitted input transfer request 44 from the DRAM 5 ((3) in FIG. 3). Then, the read control unit 31 outputs the received compressed data portion to the decompression unit 32 ((4) in FIG. 3).

The decompression unit 32 decompresses the compressed data portion received from the read control unit 31 to generate decompressed data, and outputs the generated decompressed data to the write control unit 33 ((5) in FIG. 3). The decompression unit 32 decompresses the compressed data portion that is a portion of the compressed data 61 in order from the head to generate decompressed data 62 in order from the head.

The selector 331 of the write control unit 33 writes only the decompressed data portion 622 corresponding to the partial decompression position specified in the partial decompression position information 43 in the decompressed data output by the decompression unit 32 to the storage area (the second data buffer 52) starting from the output address 42 in the DRAM 5 based on the partial decompression position information 43 and the output address 42 ((6) in FIG. 3). Specifically, the selector 331 does not write, to the DRAM 5, the 12 KB decompressed data portion 621 corresponding to the partial decompression positions (in FIG. 3, the first to third partial decompression positions) that are not specified in the partial decompression position information 43 in the decompressed data output by the decompression unit 32. Then, the selector 331 writes, to the DRAM 5, the 4 KB decompressed data portion 622 corresponding to the partial decompression position (in FIG. 3, the fourth partial decompression position) specified in the partial decompression position information 43 in the decompressed data output by the decompression unit 32. In FIG. 3, the decompressed data portion 622 written to the DRAM 5 (a transferred portion) is shown by a solid line, and the decompressed data portions 621 and 623 not written to the DRAM 5 (untransferred portions) are shown by dashed lines.

Further, the transfer completion detection unit 332 outputs the partial area transfer completion signal 45 to the read control unit 31 in response to the completion of writing of the decompressed data portions corresponding to all partial decompression positions specified in the partial decompression position information 43 to the DRAM 5 ((7) in FIG. 3). Specifically, the transfer completion detection unit 332 outputs the partial area transfer completion signal 45 to the read control unit 31 in response to the completion of writing of the decompressed data portion 622 to the DRAM 5. That is, the transfer completion detection unit 332 asserts the partial area transfer completion signal 45 in response to the completion of writing of the decompressed data portion 622 to the DRAM 5. Note that the transfer completion detection unit 332 may output the partial area transfer completion signal 45 to the read control unit 31 in response to the detection of the decompressed data portions (in FIG. 3, the decompressed data portion 622) corresponding to all partial decompression positions specified in the partial decompression position information 43 from the decompressed data output by the decompression unit 32.

The read control unit 31 performs control so as to stop reading the compressed data 61 from the DRAM 5 in response to receiving the partial area transfer completion signal 45 from the transfer completion detection unit 332. Specifically, the read control unit 31 stops transmitting the input transfer request 44 to the DRAM 5. Note that the read control unit 31 may receive a compressed data portion transferred from the DRAM 5 in response to the already-transmitted input transfer request 44. This is because if the read control unit 31 does not receive the compressed data portion transferred from the DRAM 5, the components related to data transfer such as the DRAM I/F 13 and the bus 10 may be locked. The read control unit 31 discards the received compressed data portion without outputting it to the decompression unit 32, for example.

For example, after the partial area transfer completion signal 45 is output from the transfer completion detection unit 332, the host 2 performs control so that the decompressed data portion 622 is read from the second data buffer 52 in the DRAM 5 and transferred to the host 2. This enables the host 2 to acquire the decompressed data portion 622 specified in the partial decompression position information 43.

In the example shown in FIG. 3, when the read control unit 31 reads 8 KB compressed data portion 611 from the head in the compressed data 61 and the decompression unit 32 decompresses the 8 KB compressed data portion 611, the decompressed data portion 621 and the decompressed data portion 622 are output from the decompression unit 32 to the write control unit 33. In response to the output of the decompressed data portion 622, the selector 331 writes the decompressed data portion 622 to the DRAM 5, and the transfer completion detection unit 332 outputs the partial area transfer completion signal 45 to the read control unit 31. Then, the read control unit 31 performs control so as to stop reading the compressed data 61 from the DRAM 5 in response to the partial area transfer completion signal 45.

As a result, for example, 8 KB compressed data 612 in the second half of the compressed data 61 is not read from the DRAM 5. In FIG. 3, the compressed data portion 611 read from the DRAM 5 (a transferred portion) is shown by a solid line, and the compressed data portion 612 not read from the DRAM 5 (an untransferred portion) is shown by a dashed line.

Since the 8 KB compressed data portion 612 is not read from the DRAM 5, the 16 KB decompressed data portion 623 obtained by decompressing the compressed data portion 612 is not generated by decompression or written to the DRAM 5.

Thus, when the partial decompression position information 43 specifies, for example, the decompressed data portion 622 corresponding to the fourth partial decompression position of the eight partial decompression positions, the 4 KB decompressed data portion 622 is transferred from the data decompression apparatus 15 to the DRAM 5, and the 8 KB compressed data portion 611 in the first half of the 16 KB compressed data 61 is transferred from the DRAM 5 to the data decompression apparatus 15 on average. This enables the data decompression apparatus 15 to reduce the total data transfer amount between the data decompression apparatus 15 and the DRAM 5 to about 12 KB (=4 KB+8 KB). Therefore, for example, as compared with 20 KB, which is the total data transfer amount between the data decompression apparatus 15C and the DRAM 5C of the comparative example shown in the part (b) of FIG. 2, the data decompression apparatus 15 can reduce the total data transfer amount to 60%.

Therefore, the data decompression apparatus 15 can efficiently use the bandwidth of the DRAM 5 in the case of acquiring a portion of decompressed data 62 obtained by decompressing compressed data 61. Furthermore, the data decompression apparatus 15 can reduce the latency in decompression processing by the decompression unit 32 on average by not decompressing the entire compressed data 61.

Next, the procedures of processes executed in the data decompression apparatus 15 will be described with reference to FIGS. 6 and 7.

Figure 6:
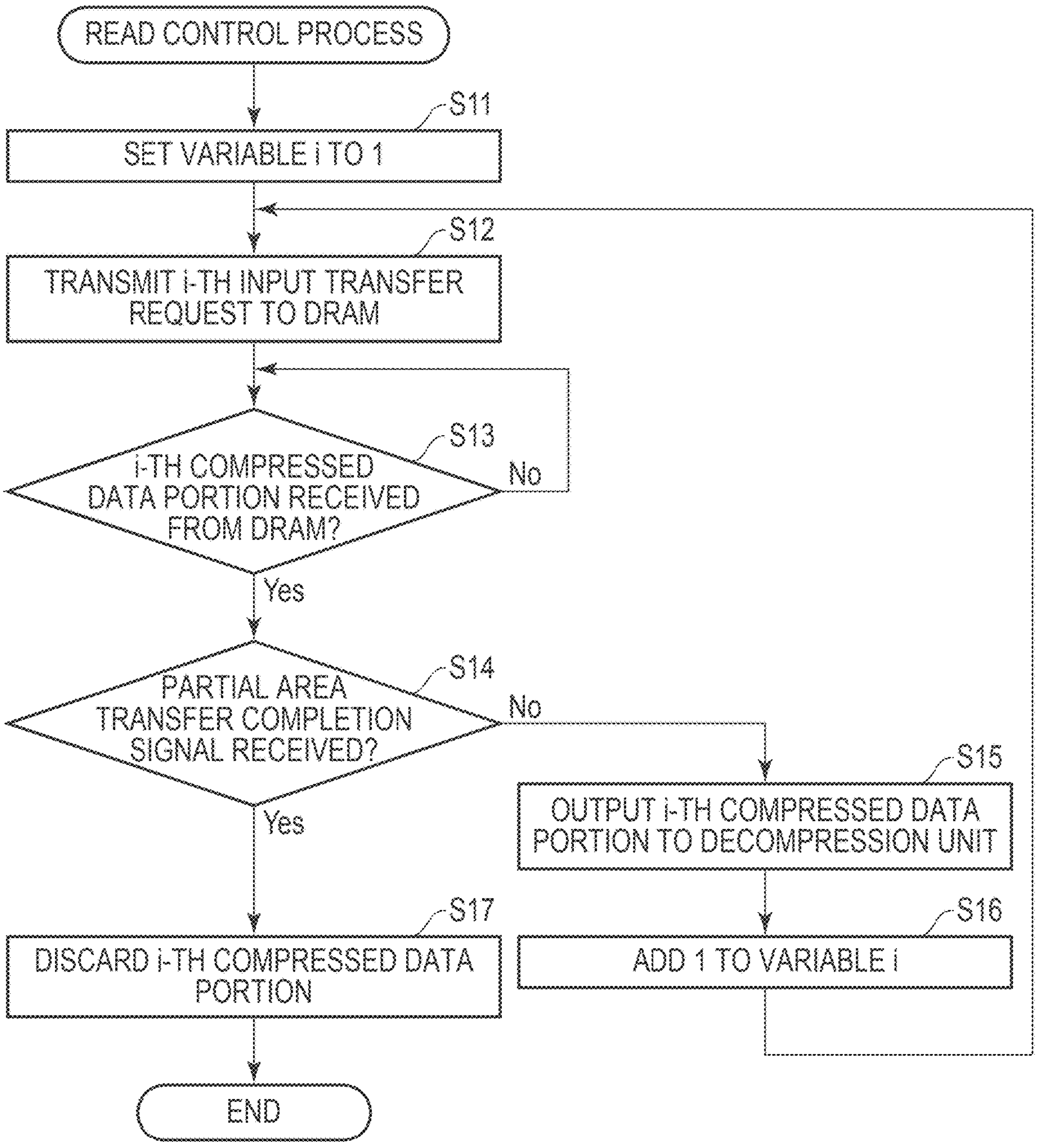
FIG. 6 is a flowchart illustrating an example of the procedure of a read control process executed in the data decompression apparatus of FIG. 1.

FIG. 6 is a flowchart illustrating an example of the procedure of a read control process executed in the data decompression apparatus 15. The read control process is a process of controlling the reading of compressed data from the DRAM 5 to the data decompression apparatus 15. The read control unit 31 of the data decompression apparatus 15 executes the read control process, for example, in response to receiving the input address 41 transmitted by the host 2. Note that it is assumed that compressed data 61 is stored in the first data buffer 51 starting from the input address 41 in the DRAM 5.

First, the read control unit 31 sets a variable i to 1 (step S11). The read control unit 31 may transmit a plurality of input transfer requests 44 to the DRAM 5 in order to read the compressed data 61 stored in the first data buffer 51 in order from the head for each second size. The variable i is a variable for identifying the i-th input transfer request 44 from the head among the plurality of input transfer requests 44.

The read control unit 31 transmits the i-th input transfer request 44 to the DRAM 5 (step S12). For example, the first input transfer request 44 is a request to transfer data stored in the storage area of the second size from the head of the first data buffer 51 (hereinafter referred to as the first storage area) to the read control unit 31. In addition, for example, the second input transfer request 44 is a request to transfer data stored in the storage area of the second size starting from the address immediately after the first storage area to the read control unit 31. The same applies to the third and subsequent input transfer requests 44. That is, in response to the i-th input transfer request 44, the i-th data portion of the second size from the head in the compressed data 61 is transferred to the read control unit 31. Hereinafter, the i-th data portion of the second size in the compressed data 61 is also simply referred to as the i-th compressed data portion.

Next, the read control unit 31 determines whether or not the i-th compressed data portion transferred in response to the i-th input transfer request 44 has been received from the DRAM 5 (step S13). When the i-th compressed data portion has not been received from the DRAM 5 (No in step S13), the read control unit 31 returns to step S13. That is, the read control unit 31 waits until the i-th compressed data portion is received from the DRAM 5.

When the i-th compressed data portion has been received from the DRAM 5 (Yes in step S13), the read control unit 31 determines whether or not the partial area transfer completion signal 45 has been received from the write control unit 33 (more specifically, the transfer completion detection unit 332) (step S14).

When the partial area transfer completion signal 45 has not been received (No in step S14), the read control unit 31 outputs the i-th compressed data portion to the decompression unit 32 (step S15). The output i-th compressed data portion is decompressed by the decompression unit 32 to generate decompressed data. Then, the read control unit 31 updates the variable i by adding 1 to the variable i (step S16) and returns to step S12. That is, based on the updated variable i, the read control unit 31 performs a process for transmitting the i-th input transfer request 44 to the DRAM 5 and receiving the i-th compressed data portion from the DRAM 5.

When the partial area transfer completion signal 45 has been received (Yes in step S14), the read control unit 31 discards the i-th compressed data portion (step S17) and ends the read control process.

By using the above read control process, the read control unit 31 transfers compressed data 61 from the DRAM 5 in order from the head for each second size and outputs it to the decompression unit 32 from when the input address 41 transmitted by the host 2 is received until the partial area transfer completion signal 45 is received from the write control unit 33. Then, the read control unit 31 performs control so as to stop reading compressed data 61 from the DRAM 5 in response to receiving the partial area transfer completion signal 45. As a result, the remaining compressed data portions in the compressed data 61 are not transferred from the DRAM 5 to the read control unit 31. Therefore, the data decompression apparatus 15 can efficiently use the bandwidth of the DRAM 5.

Figure 7:
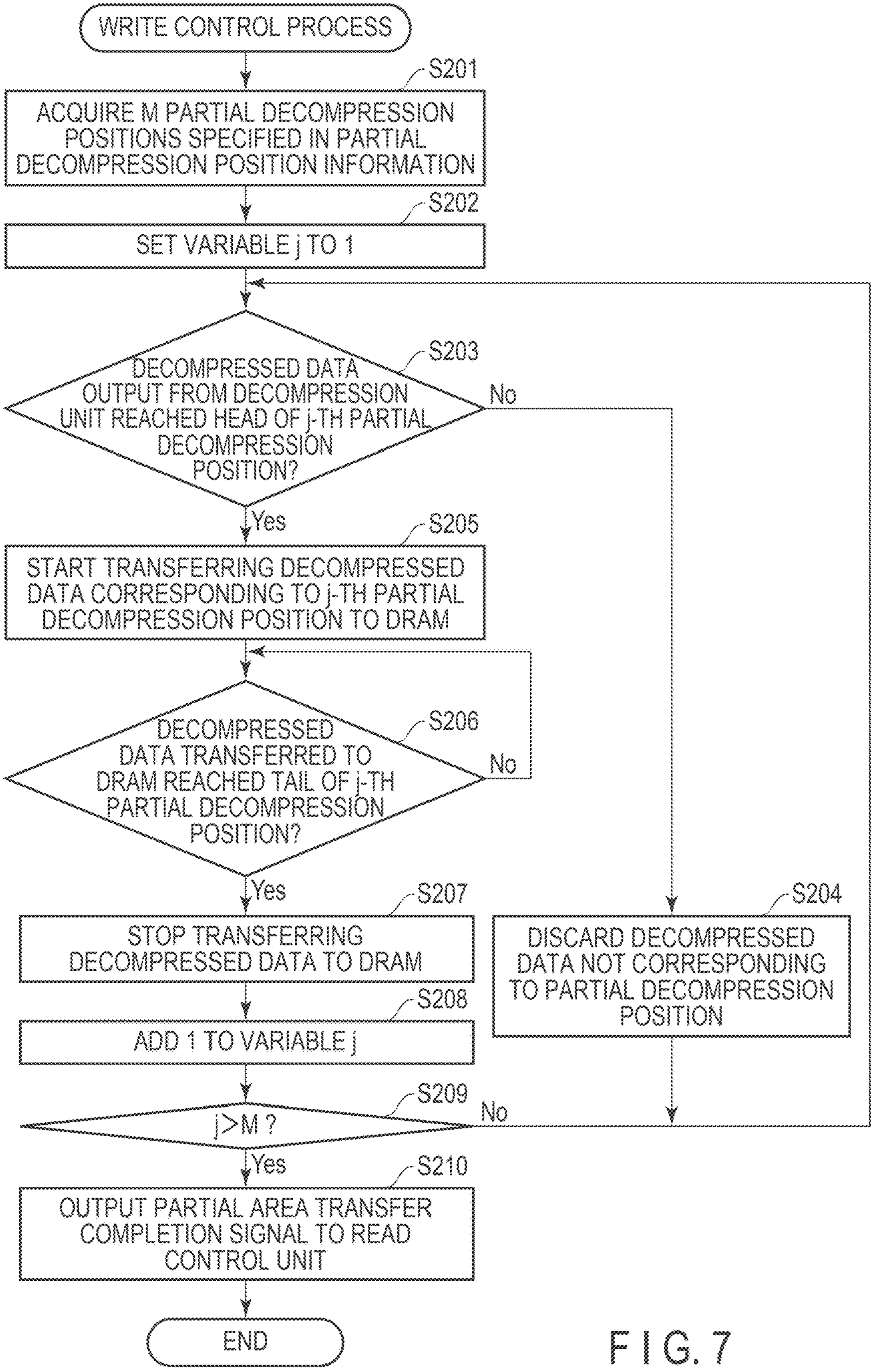
FIG. 7 is a flowchart illustrating an example of the procedure of a write control process executed in the data decompression apparatus of FIG. 1.

FIG. 7 is a flowchart illustrating an example of the procedure of a write control process executed in the data decompression apparatus 15. The write control process is a process of controlling the writing of decompressed data from the data decompression apparatus 15 to the DRAM 5. The write control unit 33 of the data decompression apparatus 15 executes the write control process, for example, in response to receiving the output address 42 and the partial decompression position information 43 transmitted by the host 2.

First, the write control unit 33 acquires M partial decompression positions specified in the received partial decompression position information 43 (step S201). The write control unit 33 sets a variable j to 1 (step S202). The variable j is a variable for identifying the j-th partial decompression position from the head among the M partial decompression positions.

The write control unit 33 monitors decompressed data output by the decompression unit 32 and determines whether or not the output decompressed data has reached the head of the j-th partial decompression position (step S203). Specifically, the write control unit 33 determines whether or not the decompressed data output by the decompression unit 32 has reached the head of the decompressed data portion 622 (the partial area 622) corresponding to the j-th partial decompression position.

When the decompressed data output by the decompression unit 32 has not reached the head of the j-th partial decompression position (No in step S203), that is, when the decompressed data is decompressed data at a position not specified in the partial decompression position information 43, the write control unit 33 discards the decompressed data (step S204) and returns to step S203. That is, the write control unit 33 discards the decompressed data up to just before reaching the head of the j-th partial decompression position. Therefore, the write control unit 33 does not transfer decompressed data corresponding to positions not specified in the partial decompression position information 43 to the DRAM 5. When the decompressed data output by the decompression unit 32 has reached the head of the j-th partial decompression position (Yes in step S203), the write control unit 33 starts transferring the decompressed data corresponding to the j-th partial decompression position to the DRAM 5 (step S205). Specifically, the write control unit 33 writes the decompressed data to the second data buffer 52 starting from the output address 42 in the DRAM 5.

Next, the write control unit 33 determines whether or not the decompressed data transferred to the DRAM 5 has reached the tail of the j-th partial decompression position (step S206). Specifically, the write control unit 33 determines whether or not the decompressed data output from the decompression unit 32 and transferred to the DRAM 5 has reached the tail of the decompressed data portion 622 corresponding to the j-th partial decompression position.

When the decompressed data transferred to the DRAM 5 has not reached the tail of the j-th partial decompression position (No in step S206), the write control unit 33 returns to step S206. That is, the write control unit 33 continues to transfer decompressed data to the DRAM 5 until the decompressed data output from the decompression unit 32 and transferred to the DRAM 5 reaches the tail of the j-th partial decompression position.

When the decompressed data transferred to the DRAM 5 has reached the tail of the j-th partial decompression position (Yes in step S206), the write control unit 33 stops transferring decompressed data to the DRAM 5 (step S207). Then, the write control unit 33 updates the variable j by adding 1 to the variable j (step S208). The write control unit 33 determines whether or not the updated variable j has exceeded the total number M of partial decompression positions (step S209). That is, the write control unit 33 determines whether or not the transfer of the M decompressed data portions 622 corresponding to the M respective partial decompression positions to the DRAM 5 has been completed.

When the updated variable j is less than or equal to the total number M of partial decompression positions (No in step S209), the write control unit 33 returns to step S203. That is, based on the updated variable j, the write control unit 33 further performs a process for transferring the decompressed data portion 622 corresponding to the j-th partial decompression position to the DRAM 5.

When the updated variable j has exceeded the total number M of partial decompression positions (Yes in step S209), the write control unit 33 outputs the partial area transfer completion signal 45 to the read control unit 31 (step S210), and ends the write control process. In response to the partial area transfer completion signal 45, the read control unit 31 performs control so as to stop reading compressed data 61 stored in the DRAM 5.

By using the above write control process, the write control unit 33 transfers only the M decompressed data portions 622 corresponding to the M respective partial decompression positions specified in the partial decompression position information 43 to the DRAM 5 (more specifically, the second data buffer 52). In other words, the write control unit 33 does not transfer decompressed data portion corresponding to positions not specified in the partial decompression position information 43 to the DRAM 5.

Further, the write control unit 33 outputs the partial area transfer completion signal 45 to the read control unit 31 in response to the completion of transfer of the M decompressed data portions 622 to the DRAM 5. Thereby, the read control unit 31 performs control so as to stop reading compressed data 61 stored in the DRAM 5.

Therefore, the data decompression apparatus 15 can efficiently use the bandwidth of the DRAM 5.

Figure 8:
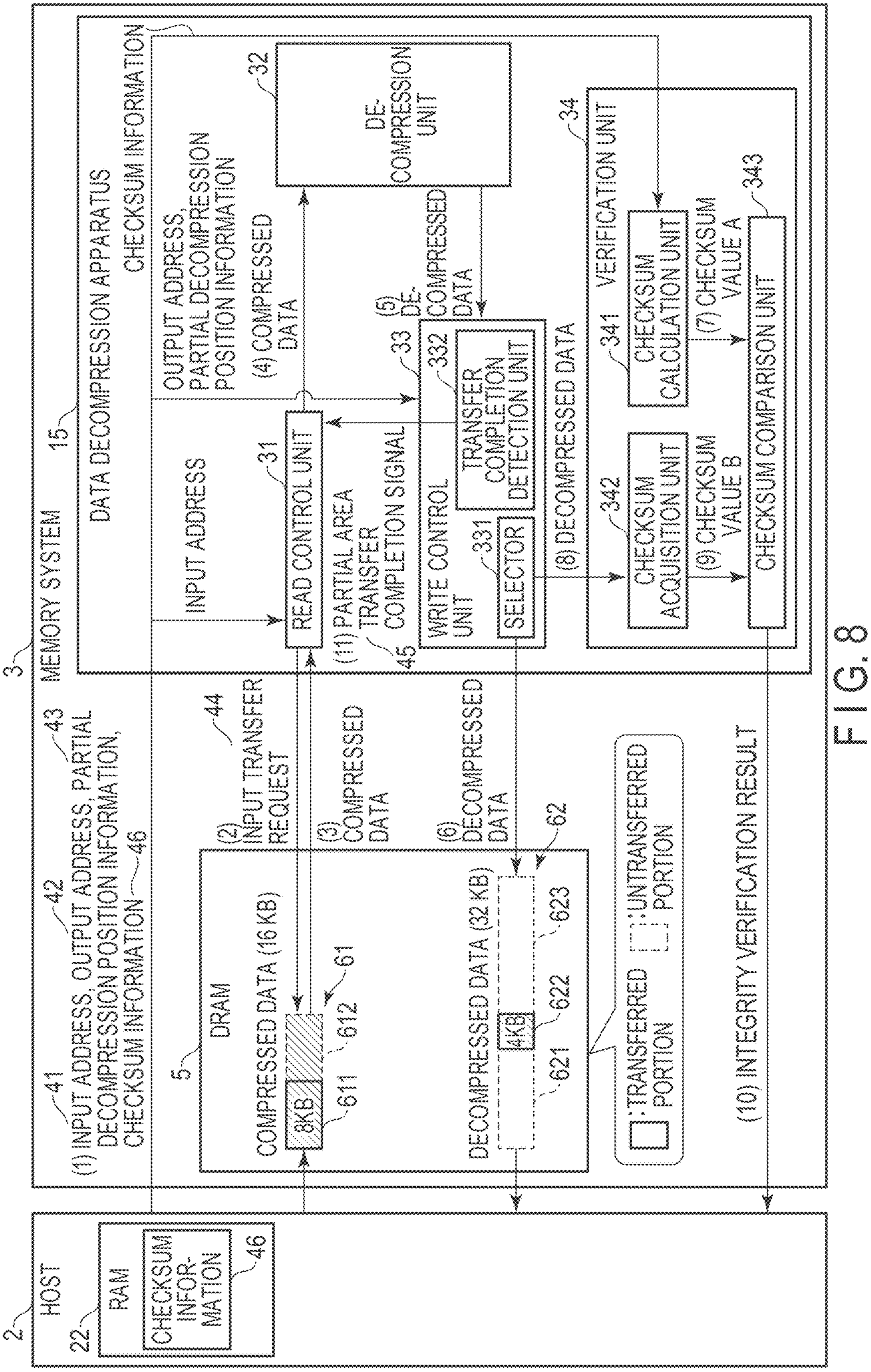
FIG. 8 is a block diagram illustrating an example of the configuration and operation of a data decompression apparatus.

The data decompression apparatus 15 illustrated in FIG. 8 may include a component that verifies the integrity of decompressed data in addition to the components of the data decompression apparatus 15 in FIG. 1. Integrity verification is a process of confirming that data corruption has not occurred in which decompressed data does not coincide with the original plaintext data from which compressed data is obtained through compression processing and decompression processing. Specifically, the data decompression apparatus 15 in FIG. 8 verifies the integrity of a decompressed data portion corresponding to a partial decompression position specified in the partial decompression position information 43.

In the data decompression apparatus 15C of the comparative example described above with reference to FIG. 2, the entire compressed data 61C of the compression unit is transferred from the DRAM 5C to the decompression unit 32C, for example, in order to verify the integrity of the decompressed data 62C. For example, when the compressed data 61C is in the gzip format, the compressed data 61C includes the data size before compression and a checksum value for the data before compression. In this case, the decompression unit 32C decompresses the entire compressed data 61C to generate the decompressed data 62C. Then, the decompression unit 32C verifies the integrity of the decompressed data 62C based on whether the size of the decompressed data 62C coincides with the data size before compression and whether the checksum value for the decompressed data 62C coincides with the checksum value for the data before compression.

Thus, in the data decompression apparatus 15C of the comparative example, it is necessary to transfer the entire compressed data 61C from the DRAM 5C to the decompression unit 32C in order to verify the integrity of the decompressed data 62C.

On the other hand, the data decompression apparatus 15 in FIG. 8 has a component for verifying the integrity of the decompressed data portion 622 even when performing control so that the transfer of compressed data 61 from the DRAM 5 to the data decompression apparatus 15 is stopped in response to the completion of transfer of the decompressed data portion 622 to be acquired in the decompressed data 62 to the DRAM 5. That is, the data decompression apparatus 15 in FIG. 8 verifies the integrity of the decompressed data portion 622 without decompressing the entire compressed data 61.

The data decompression apparatus 15 in FIG. 8 further includes a component that verifies the integrity of decompressed data.

FIG. 8 is a block diagram illustrating an example of the configuration and operation of the data decompression apparatus 15.

The data decompression apparatus 15 may acquire information transmitted by the host 2 via the host I/F 14, for example. The information transmitted by the host 2 includes, for example, an input address 41, an output address 42, partial decompression position information 43, and checksum information 46. The input address 41, the output address 42, and the partial decompression position information 43 are as described above with reference to FIGS. 3 to 5.

The checksum information 46 is information on M checksum values corresponding to the M respective partial decompression positions specified in the partial decompression position information 43. In order to confirm that data corruption has not occurred, the file system of the host 2 may add a checksum value to plaintext data of the compression unit for each data portion of the first size (e.g., 4 KB) as metadata, for example. The plaintext data of the compression unit is the original data from which the compressed data 61 is acquired by compression. The checksum value is, for example, a CRC code obtained by cyclic redundancy check (CRC) of the corresponding data portion of the first size calculated by the host 2. For example, CRC-16 or CRC-32 is used as the CRC for calculating the checksum value. The type of CRC used to calculate the checksum value is predefined in the information processing system 1 (i.e., the host 2 and the memory system 3), for example. Further, the checksum information 46 for the M checksum values calculated by the host 2 is stored in a RAM 22 in the host 2, for example. Thus, the host 2 can provide the data decompression apparatus 15 with the M checksum values corresponding to the M respective partial decompression positions.

Specifically, the checksum information 46 includes, for example, M checksum values. That is, the checksum information 46 is information for passing the M checksum values themselves to the data decompression apparatus 15 (pass-by-value). The M checksum values are arranged in order of closeness of their corresponding partial decompression positions to the head of the decompressed data 62 (in other words, in order of closeness to the head of the original plaintext data).

Alternatively, the checksum information 46 may be information indicating a storage area in which the M checksum values are stored in the memory (e.g., the RAM 22) in the host 2. That is, the checksum information 46 may be information for passing a pointer to a storage area in which the M checksum values are stored to the data decompression apparatus 15 (pass-by-pointer). The pointer indicates, for example, the head address of the storage area in which the M checksum values are stored.

Note that, for example, pass-by-pointer may also be used when other information such as the partial decompression position information 43 is transmitted from the host 2 to the data decompression apparatus 15. For example, the partial decompression position information 43 may be information indicating a pointer to a storage area in the host 2 in which information indicating the M partial decompression positions is stored.

The data decompression apparatus 15 includes, for example, the read control unit 31, the decompression unit 32, the write control unit 33, and a verification unit 34. The operation of the read control unit 31 and the decompression unit 32 is as described above with reference to FIG. 3. The operation of the write control unit 33 is as described above with reference to FIG. 3, except that the selector 331 transmits (outputs) a decompressed data portion 622 not only to the DRAM 5 but also to the verification unit 34. The decompressed data portion 622 is decompressed data corresponding to a partial decompression position specified in the partial decompression position information 43 in the decompressed data output from the decompression unit 32.

Therefore, the operations (1) to (6) and (11) in FIG. 8 are the same as the operations (1) to (7) in FIG. 3, except that the verification unit 34 receives the checksum information 46 transmitted by the host 2 in the operation (1).

The verification unit 34 is a circuit that verifies the integrity of the decompressed data portion 622 received from the selector 331 using the checksum information 46 transmitted by the host 2. The verification unit 34 notifies the host 2 of an integrity verification result of the decompressed data portion 622.

The verification unit 34 includes, for example, a checksum acquisition unit 341, a checksum calculation unit 342, and a checksum comparison unit 343. The checksum acquisition unit 341 acquires M checksum values corresponding to M respective partial decompression positions specified in the partial decompression position information 43 using the checksum information 46. The checksum calculation unit 342 calculates a checksum value for each of the M decompressed data portions 622 received from the selector 331. The checksum comparison unit 343 compares the M checksum values calculated by the checksum calculation unit 342 with the M checksum values acquired by the checksum acquisition unit 341 in order from the head, and notifies the host 2 of the comparison result.

The operation of the checksum acquisition unit 341, the checksum calculation unit 342, and the checksum comparison unit 343 will be described more specifically. In the following, a case where the compression unit is 32 KB and the compression ratio is 2 will mainly be described as an example. 16 KB compressed data 61 is stored in the DRAM 5. Decompressed data 62 obtained when the entire 16 KB compressed data 61 is decompressed is 32 KB data. The 32 KB decompressed data 62 includes eight 4 KB decompressed data portions. Here, it is assumed that the partial decompression position information 43 specifies one decompressed data portion 622 corresponding to the fourth partial decompression position of the eight partial decompression positions (i.e., it is assumed that M=1).

The checksum acquisition unit 341 receives the checksum information 46 transmitted by the host 2 ((1) in FIG. 8). The checksum acquisition unit 341 acquires the checksum value included in the received checksum information 46. Alternatively, the checksum acquisition unit 341 acquires (transfers) the checksum value from the RAM 22 in the host 2 based on the pointer included in the checksum information 46. The acquired checksum value is also referred to as the checksum value A. The checksum acquisition unit 341 outputs the checksum value A to the checksum comparison unit 343 ((7) in FIG. 8)

The checksum calculation unit 342 receives the decompressed data portion 622 from the selector 331 ((8) in FIG. 8). The checksum calculation unit 342 calculates the checksum value for the received decompressed data portion 622. The calculated checksum value is also referred to as the checksum value B. The same CRC (e.g., CRC-16) as the CRC used by the host 2 to calculate the checksum value A is used for the calculation of the checksum value B. The checksum calculation unit 342 outputs the checksum value B to the checksum comparison unit 343 ((9) in FIG. 8).

The checksum comparison unit 343 verifies the integrity of the decompressed data portion 622 by comparing the checksum value A received from the checksum acquisition unit 341 with the checksum value B received from the checksum calculation unit 342. Specifically, the checksum comparison unit 343 generates a verification result (a comparison result) indicating whether or not data corruption has occurred in the decompressed data portion 622 depending on whether or not the checksum value A and the checksum value B coincide with each other. That is, when the checksum value A and the checksum value B coincide with each other, the checksum comparison unit 343 generates a verification result indicating that data corruption has not occurred in the decompressed data portion 622. On the other hand, when the checksum value A and the checksum value B do not coincide with each other, the checksum comparison unit 343 generates a verification result indicating that data corruption has occurred in the decompressed data portion 622. Then, the checksum comparison unit 343 notifies the host 2 of the generated verification result ((10) in FIG. 8). The checksum comparison unit 343 notifies the host 2 of the verification result, for example, by including the verification result in a response (completion) to a request (e.g., a command) from the host 2 to acquire the decompressed data portion 622.

Note that when the partial decompression position information 43 specifies M partial decompression positions, the checksum comparison unit 343 may compare, for example, each of the M checksum values acquired based on the checksum information 46 with a corresponding one of the checksum values calculated from the M respective decompressed data portions 622 to generate M verification results. The checksum comparison unit 343 notifies the host 2 of the M verification results, for example. The checksum comparison unit 343 may notify the host 2 of either the verification results indicating the decompressed data portions 622 in which data corruption has occurred or the verification results indicating the decompressed data portions 622 in which data corruption has not occurred among the M verification results.

Alternatively, the checksum comparison unit 343 may notify the host 2 of a verification result indicating either that data corruption has not occurred in all of the M decompressed data portions 622 or that data corruption has occurred in at least one of the M decompressed data portions 622 based on the M verification results. In this case, the checksum comparison unit 343 may compare the exclusive OR (first exclusive OR) of the M checksum values acquired based on the checksum information 46 with the exclusive OR (second exclusive OR) of the M checksum values calculated from the M respective decompressed data portions 622 to generate a verification result. That is, when the first exclusive OR and the second exclusive OR coincide with each other, the checksum comparison unit 343 notifies the host 2 of a verification result indicating that data corruption has not occurred in all the M decompressed data portions 622. On the other hand, when the first exclusive OR and the second exclusive OR do not coincide with each other, the checksum comparison unit 343 notifies the host 2 of a verification result indicating that data corruption has occurred in at least one of the M decompressed data portions 622.

With the above configuration and operation, the data decompression apparatus 15 can verify the integrity of a decompressed data portion 622 to be acquired without transferring and decompressing the entire compressed data 61. More specifically, the data decompression apparatus 15 can verify the integrity of each decompressed data portion 622 instead of verifying the integrity of the entire decompressed data 62C using the data size before compression included in the compressed data 61C and the checksum value for the data before compression as in the data decompression apparatus 15C of the comparative example. This makes it possible to efficiently use the bandwidth of the DRAM 5 even when a portion of decompressed data 62 (i.e., a decompressed data portion 622) obtained by decompressing compressed data 61 is acquired and the integrity of the decompressed data portion 622 is verified.

Next, the procedures of processes executed in the data decompression apparatus 15 will be described.

The read control process executed in the data decompression apparatus 15 is the same as the read control process described above with reference to the flowchart of FIG. 6.

Further, the write control process executed in the data decompression apparatus 15 corresponds to a process in which the transfer destination of decompressed data is changed from only the DRAM 5 to the DRAM 5 and the verification unit 34 in the process from step S205 to step S207 of the write control process described above with reference to the flowchart of FIG. 7. That is, in the write control process executed in the data decompression apparatus 15 of FIG. 8, a decompressed data portion 622 corresponding to the partial decompression position specified in the partial decompression position information 43 is transferred not only to the DRAM 5 but also to the verification unit 34.

Figure 9:
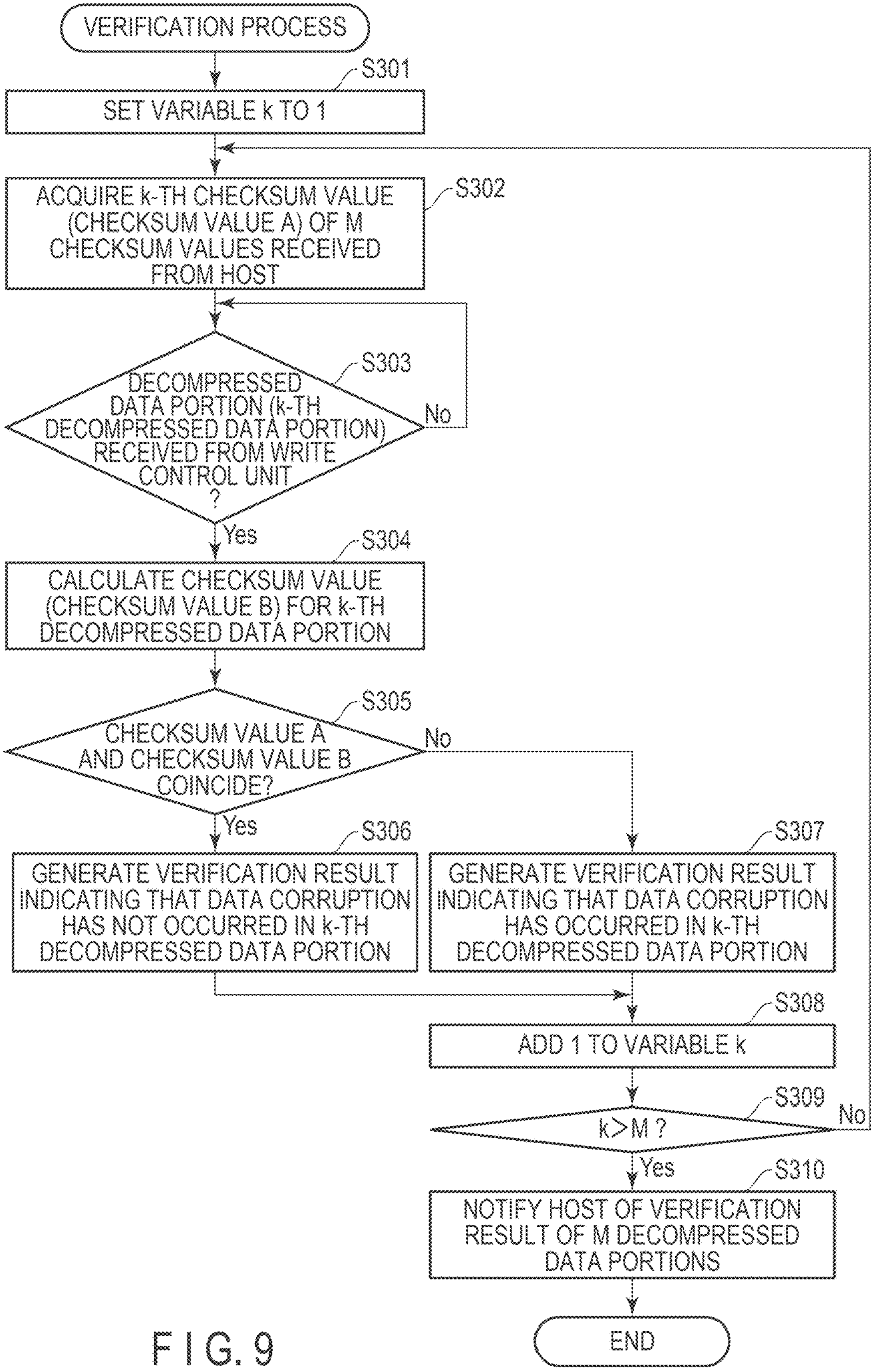
FIG. 9 is a flowchart illustrating an example of the procedure of a verification process executed in the data decompression apparatus of FIG. 8.

FIG. 9 is a flowchart illustrating an example of the procedure of a verification process executed in the data decompression apparatus 15. The verification process is a process of verifying the integrity of decompressed data. The verification unit 34 of the data decompression apparatus 15 executes the verification process, for example, in response to acquiring checksum information 46 from the host 2. Here, a case where the checksum information 46 includes M checksum values corresponding to M respective partial decompression positions specified in the partial decompression position information 43 will be described as an example.

First, the verification unit 34 sets a variable k to 1 (step S301). The variable k is a variable for identifying the k-th checksum value from the head among the M checksum values included in the checksum information 46. The verification unit 34 acquires the k-th checksum value (the checksum value A) of the M checksum values (step S302).

Next, the verification unit 34 determines whether or not a decompressed data portion 622 has been received from the write control unit 33 (more specifically, the selector 331) (step S303). This decompressed data portion 622 is a decompressed data portion 622 corresponding to the k-th partial decompression position of the M partial decompression positions specified in the partial decompression position information 43 (hereinafter also referred to as the k-th decompressed data portion 622).

When the k-th decompressed data portion 622 has not been received from the write control unit 33 (No in step S303), the verification unit 34 returns to step S303. That is, the verification unit 34 waits until the k-th decompressed data portion 622 is received from the write control unit 33.

When the k-th decompressed data portion 622 has been received from the write control unit 33 (Yes in step S303), the verification unit 34 calculates the checksum value (the checksum value B) for the received k-th decompressed data portion 622 (step S304). Then, the verification unit 34 compares the checksum value A with the checksum value B to determine whether or not the checksum value A and the checksum value B coincide with each other (step S305).

When the checksum value A and the checksum value B coincide with each other (Yes in step S305), the verification unit 34 generates a verification result indicating that data corruption has not occurred in the k-th decompressed data portion 622 (step S306), and proceeds to step S308.

When the checksum value A and the checksum value B do not coincide with each other (No in step S305), the verification unit 34 generates a verification result indicating that data corruption has occurred in the k-th decompressed data portion 622 (step S307), and proceeds to step S308.

Next, the verification unit 34 updates the variable k by adding 1 to the variable k (step S308). Then, the verification unit 34 determines whether or not the updated variable k has exceeded the total number M of checksum values included in the checksum information 46 (step S309). That is, the verification unit 34 determines whether or not the verification of integrity of the corresponding decompressed data portions 622 using all the M checksum values has been completed.

When the updated variable k is less than or equal to the total number M of checksum values (No in step S309), the verification unit 34 returns to step S302. That is, based on the updated variable k, the verification unit 34 further performs a process for verifying the integrity of the k-th decompressed data portion 622 using the k-th checksum value.

When the updated variable k has exceeded the total number M of checksum values (Yes in step S309), the verification unit 34 notifies the host 2 of the integrity verification result of the M decompressed data portions 622 (step S310), and ends the verification process. Specifically, the verification unit 34 notifies the host 2 of the verification result, for example, by including the integrity verification result of the M decompressed data portions 622 in a response to a request from the host 2 to acquire the M decompressed data portions 622.

By using the above verification process, the verification unit 34 uses the checksum information 46 acquired from the host 2 to verify the integrity of the corresponding decompressed data portion 622. Thereby, together with the M decompressed data portions 622 corresponding to the M respective partial decompression positions specified in the partial decompression position information 43, the host 2 can acquire an integrity verification result of these M decompressed data portions 622.

The data decompression apparatus 15 illustrated in FIG. 8 verifies the integrity of decompressed data using the checksum information 46 received from the host 2. On the other hand, a data decompression apparatus 15 illustrated in FIG. 10 verifies the integrity of decompressed data using checksum information included in the decompressed data without receiving the checksum information 46 from the host 2.

Figure 10:
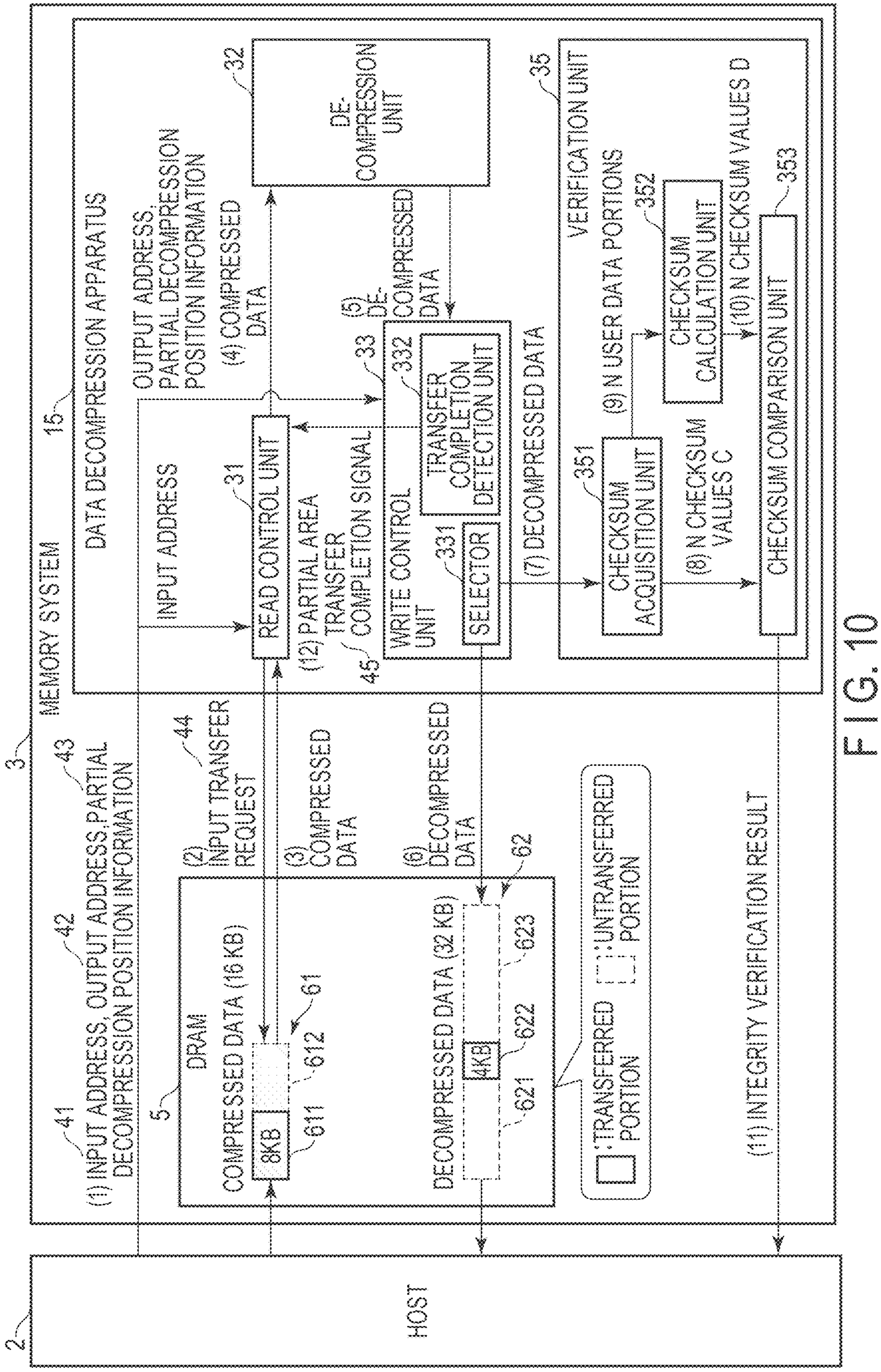
FIG. 10 is a block diagram illustrating an example of the configuration and operation of a data decompression apparatus.

The configuration of the data decompression apparatus 15 illustrated in FIG. 10 includes a component that verifies the integrity of decompressed data in a different way from the data decompression apparatus 15 of the second embodiment.

FIG. 10 is a block diagram illustrating an example of the configuration and operation of the data decompression apparatus 15.

The data decompression apparatus 15 may acquire information transmitted by the host 2 via the host I/F 14, for example. The information transmitted by the host 2 includes, for example, an input address 41, an output address 42, and partial decompression position information 43. The input address 41, the output address 42, and the partial decompression position information 43 are as described above with reference to FIGS. 3 to 5.

The data decompression apparatus 15 includes, for example, the read control unit 31, the decompression unit 32, the write control unit 33, and a verification unit 35. The operation of the read control unit 31 is as described above with reference to FIG. 3. The operation of the decompression unit 32 is as described above with reference to FIG. 3, except that generated and output decompressed data (decompressed data portion) includes a checksum value.

In the memory system 3, a format in which protection information (PI) is added to user data to be written to the NAND type flash memory 4 for each specific size may be used.

Figure 11:
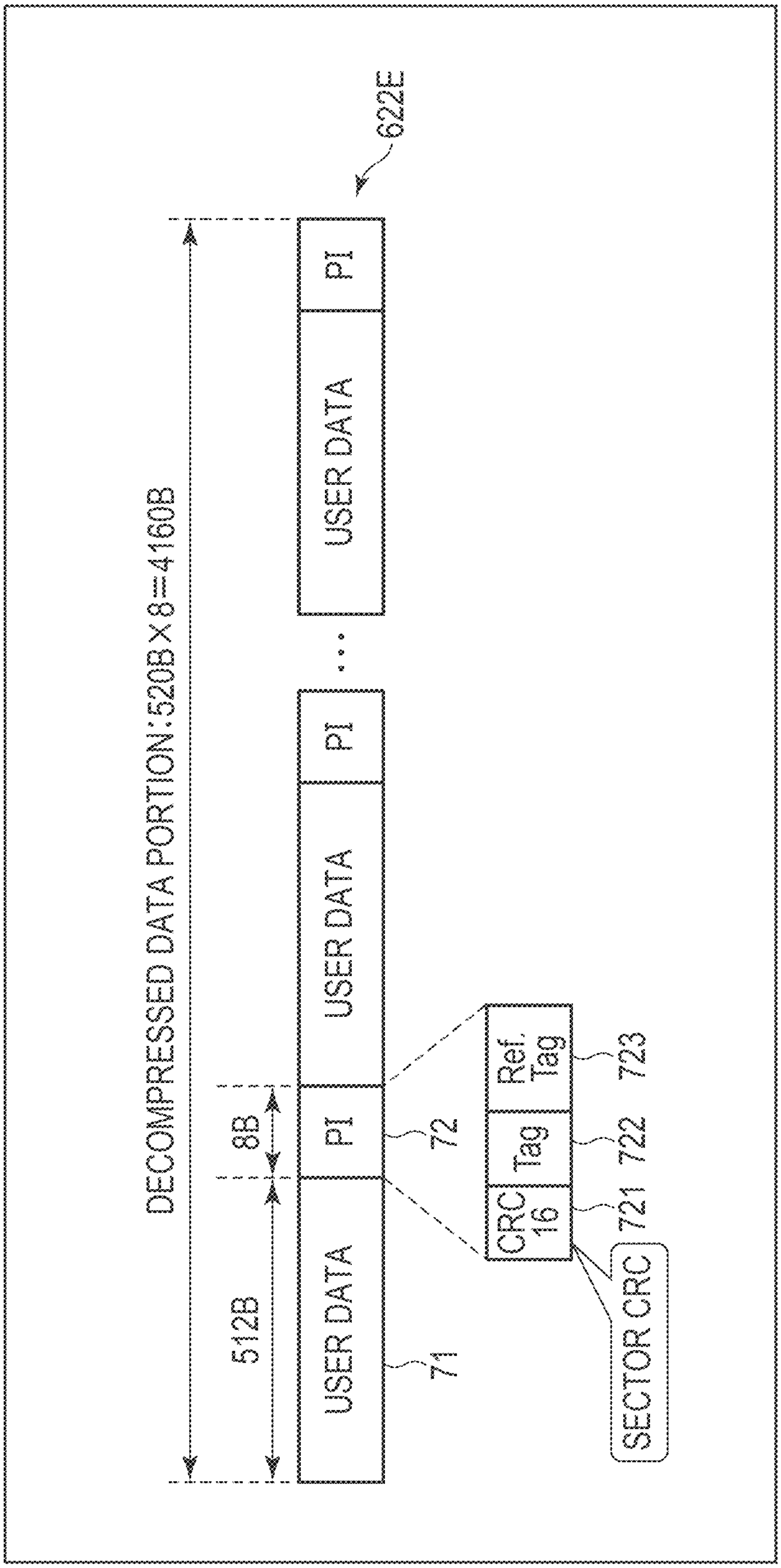
FIG. 11 is a diagram illustrating an example of a data structure of a decompressed data portion including checksum values in the data decompression apparatus of FIG. 10.

FIG. 11 shows an example of a data structure of a decompressed data portion including checksum values. A decompressed data portion 622E is data in a format in which PI 72 is added to a decompressed data portion of the first size for each specific size. Hereinafter, it is assumed that the decompressed data portion of the first size included in the decompressed data portion 622E corresponds to the decompressed data portion 622 corresponding to a partial decompression position specified in the partial decompression position information 43.

The decompressed data portion 622E includes, for example, N pairs of a user data portion 71 and PI 72. N is an integer greater than or equal to 1. The size of the decompressed data portion 622E (hereinafter also referred to as the third size) is larger than the size (the first size) of the decompressed data portion 622 including only user data by the size of the included N pieces of PI 72.

The concatenated N user data portions 71 correspond to the decompressed data portion 622 of the first size. That is, one user data portion 71 is at least a portion of the decompressed data portion 622. The size of one user data portion 71 (hereinafter also referred to as the fourth size) is a size obtained by dividing the first size by N. The fourth size is predefined in the memory system 3, for example. For example, when the first size is 4 KB (4096 B (byte)) and N is 8, the fourth size is 512 B.

The PI 72 is information for protecting the user data portion 71. The size of PI 72 is referred to as the fifth size. The fifth size is predefined in the memory system 3, for example. The fifth size is, for example, 8 B. The PI 72 includes, for example, a checksum value 721, a Tag 722, and a Reference Tag (Ref. Tag) 723.

The checksum value 721 is a checksum value calculated for the user data portion 71. The checksum value 721 is, for example, a CRC code based on CRC-16. The checksum value 721 is also referred to as the sector CRC 721.

The Tag 722 includes data that is not interpreted by the controller 6 and may be used to disable the check of the PI 72.

The Ref. Tag 723 includes information for associating the user data portion 71 with an address. The Ref. Tag 723 includes, for example, at least a part of LBA specified in a write request (a write command) received from the host 2 together with the N user data portions 71.

FIG. 11 shows an example in which the decompressed data portion 622E includes eight pairs of a user data portion 71 and PI 72 (i.e., N=8), the size of a user data portion 71

(the fourth size) is 512 B, and the size of PI 72 (the fifth size) is 8 B. In this case, the size of the decompressed data portion 622E (the third size) is 4160 B (=(512 B+8 B)× 8).

In the decompressed data portion 622E having such a data structure, the checksum value 721 included in the PI 72 can be used to verify the integrity of the corresponding user data portion 71. That is, in the decompressed data portion 622E, the integrity of the N user data portions 71 can be verified using the N checksum values 721.

Return to FIG. 10.

The decompression unit 32 outputs decompressed data including the decompressed data portion 622E as shown in FIG. 11 to the write control unit 33. In other words, the decompression unit 32 outputs decompressed data in which PI 72 is added to each user data portion 71 of the fourth size to the write control unit 33.

Therefore, when the partial decompression position specified in the partial decompression position information 43 corresponds to the decompressed data portion 622, the selector 331 of the write control unit 33 transfers the decompressed data portion 622E (i.e., decompressed data including N pieces of PI 72) output from the decompression unit 32 to the DRAM 5. In this case, the host 2 may transfer the decompressed data portion 622E from the DRAM 5 and perform a process using the PI 72 included in the decompressed data portion 622E. Further, the selector 331 outputs the decompressed data portion 622E output from the decompression unit 32 to the verification unit 35.

Therefore, the operations (1) to (6) and (12) in FIG. 10 are the same as the operations (1) to (7) in FIG. 3, except that the selector 331 transfers the decompressed data portion 622E output from the decompression unit 32 to the DRAM 5.

The verification unit 35 is a circuit that verifies the integrity of the decompressed data portion 622 using the decompressed data portion 622E received from the selector 331. Specifically, the verification unit 35 verifies the integrity of the N user data portions 71, for example, using the N checksum values 721 included in the decompressed data portion 622E. The verification unit 35 notifies the host 2 of the integrity verification result of the decompressed data portion 622.

The verification unit 35 includes, for example, a checksum acquisition unit 351, a checksum calculation unit 352, and a checksum comparison unit 353. The checksum acquisition unit 351 acquires the N user data portions 71 and the N checksum values 721 from the decompressed data portion 622E. The checksum calculation unit 352 calculates a checksum value for each of the N user data portions 71 acquired by the checksum acquisition unit 351. The checksum comparison unit 353 compares the N checksum values 721 acquired by the checksum acquisition unit 351 with the N respective checksum values calculated by the checksum calculation unit 352 in order from the head, and notifies the host 2 of the comparison result.

The operation of the checksum acquisition unit 351, the checksum calculation unit 352, and the checksum comparison unit 353 will be described more specifically.

The checksum acquisition unit 351 receives the decompressed data portion 622E output by the selector 331 ((7) in FIG. 10). The checksum acquisition unit 351 acquires the N user data portions 71 and the N checksum values 721 in order from the head of the received decompressed data portion 622E. The acquired checksum values 721 are also referred to as the checksum values C. The checksum acquisition unit 351 outputs the N checksum values C to the checksum comparison unit 353 ((8) in FIG. 10). Further, the checksum acquisition unit 351 outputs the acquired N user data portions 71 to the checksum calculation unit 352 ((9) in FIG. 10).

The checksum calculation unit 352 calculates N checksum values corresponding to the N respective user data portions 71 received from the checksum acquisition unit 351. The calculated checksum values are also referred to as the checksum values D. The same CRC as the CRC used to calculate the checksum values C in the memory system 3 (e.g., CRC-16) is used for the calculation of the checksum values D. The checksum calculation unit 352 outputs the N checksum values D to the checksum comparison unit 353 ((10) in FIG. 10).

The checksum comparison unit 353 verifies the integrity of each of the N user data portions 71 by comparing the N checksum values C received from the checksum acquisition unit 351 with the N respective checksum values D received from the checksum calculation unit 352 in order from the head. Then, the checksum comparison unit 353 generates N verification results corresponding to the N respective user data portions 71.

Specifically, the checksum comparison unit 353 generates a verification result indicating whether or not data corruption has occurred in the first user data portion 71 of the N user data portions 71 depending on whether or not the first checksum value C of the N checksum values C and the first checksum value D of the N checksum values D coincide with each other. That is, when the first checksum value C and the first checksum value D coincide with each other, the checksum comparison unit 353 generates a verification result indicating that data corruption has not occurred in the first user data portion 71. On the other hand, when the first checksum value C and the first checksum value D do not coincide with each other, the checksum comparison unit 353 generates a verification result indicating that data corruption has occurred in the first user data portion 71. The same applies to the verification of integrity of the second and subsequent user data portions 71 by the checksum comparison unit 353.

Then, the checksum comparison unit 353 notifies the host 2 of the generated verification result ((11) in FIG. 10). The checksum comparison unit 353 notifies the host 2 of the verification result, for example, by including the verification result in a response to a request from the host 2 to acquire the decompressed data portion 622. Specifically, the checksum comparison unit 353 notifies the host 2 of the N verification results, for example. The checksum comparison unit 353 may notify the host 2 of either the verification results indicating the user data portions 71 in which data corruption has occurred or the verification results indicating the user data portions 71 in which data corruption has not occurred among the N verification results.

Alternatively, the checksum comparison unit 353 may notify the host 2 of a verification result indicating either that data corruption has not occurred in all of the N user data portions 71 (i.e., the entire decompressed data portion 622) or that data corruption has occurred in at least one of the N user data portions 71 based on the N verification results. In this case, the checksum comparison unit 353 may compare the exclusive OR (third exclusive OR) of the N checksum values C with the exclusive OR (fourth exclusive OR) of the N checksum values D to generate a verification result. That is, when the third exclusive OR and the fourth exclusive OR coincide with each other, the checksum comparison unit 353 notifies the host 2 of a verification result indicating that data corruption has not occurred in all the N user data portions 71. On the other hand, when the third exclusive OR and the fourth exclusive OR do not coincide with each other, the checksum comparison unit 353 notifies the host 2 of a verification result indicating that data corruption has occurred in at least one of the N user data portions 71.

Note that when the partial decompression position information 43 specifies M partial decompression positions, the checksum acquisition unit 351, the checksum calculation unit 352, and the checksum comparison unit 353 generate (N× M) verification results by performing the above-described integrity verification of the N user data portions 71 for the decompressed data portions 622E corresponding to the M respective partial decompression positions, for example. The checksum comparison unit 353 notifies the host 2 of the (N×M) verification results, for example. The checksum comparison unit 353 may notify the host 2 of either the verification results indicating the decompressed data portions 622 in which data corruption has occurred or the verification results indicating the decompressed data portions 622 in which data corruption has not occurred based on the (N× M) verification results. Alternatively, the checksum comparison unit 353 may notify the host 2 of a verification result indicating either that data corruption has not occurred in all of the M decompressed data portions 622 or that data corruption has occurred in at least one of the M decompressed data portions 622 based on the (N×M) verification results.

With the above configuration and operation, the data decompression apparatus 15 can verify the integrity of the N user data portions 71 included in a decompressed data portion 622 to be acquired without transferring and decompressing the entire compressed data 61. Therefore, the data decompression apparatus 15 can verify the integrity of the decompressed data portion 622 to be acquired. This makes it possible to efficiently use the bandwidth of the DRAM 5 even when a portion of decompressed data 62 (i.e., a decompressed data portion 622) obtained by decompressing compressed data 61 is acquired and the integrity of the decompressed data portion 622 is verified.

Next, processes executed in the data decompression apparatus 15 will be described.

The read control process executed in the data decompression apparatus 15 is the same as the read control process described above with reference to the flowchart of FIG. 6.

Further, the write control process executed in the data decompression apparatus 15 corresponds to a process in which the transfer destination of decompressed data is changed from only the DRAM 5 to the DRAM 5 and the verification unit 35 in the process from step S205 to step S207 of the write control process described above with reference to the flowchart of FIG. 7. Note that in the decompressed data output from the decompression unit 32, PI 72 is added to each user data portion 71 of the fourth size. Therefore, the write control unit 33 (more specifically, the selector 331) transfers the decompressed data including the PI 72 output from the decompression unit 32 to the DRAM 5. Further, the write control unit 33 outputs the decompressed data including the PI 72 output from the decompression unit 32 to the verification unit 35.

Figure 12:
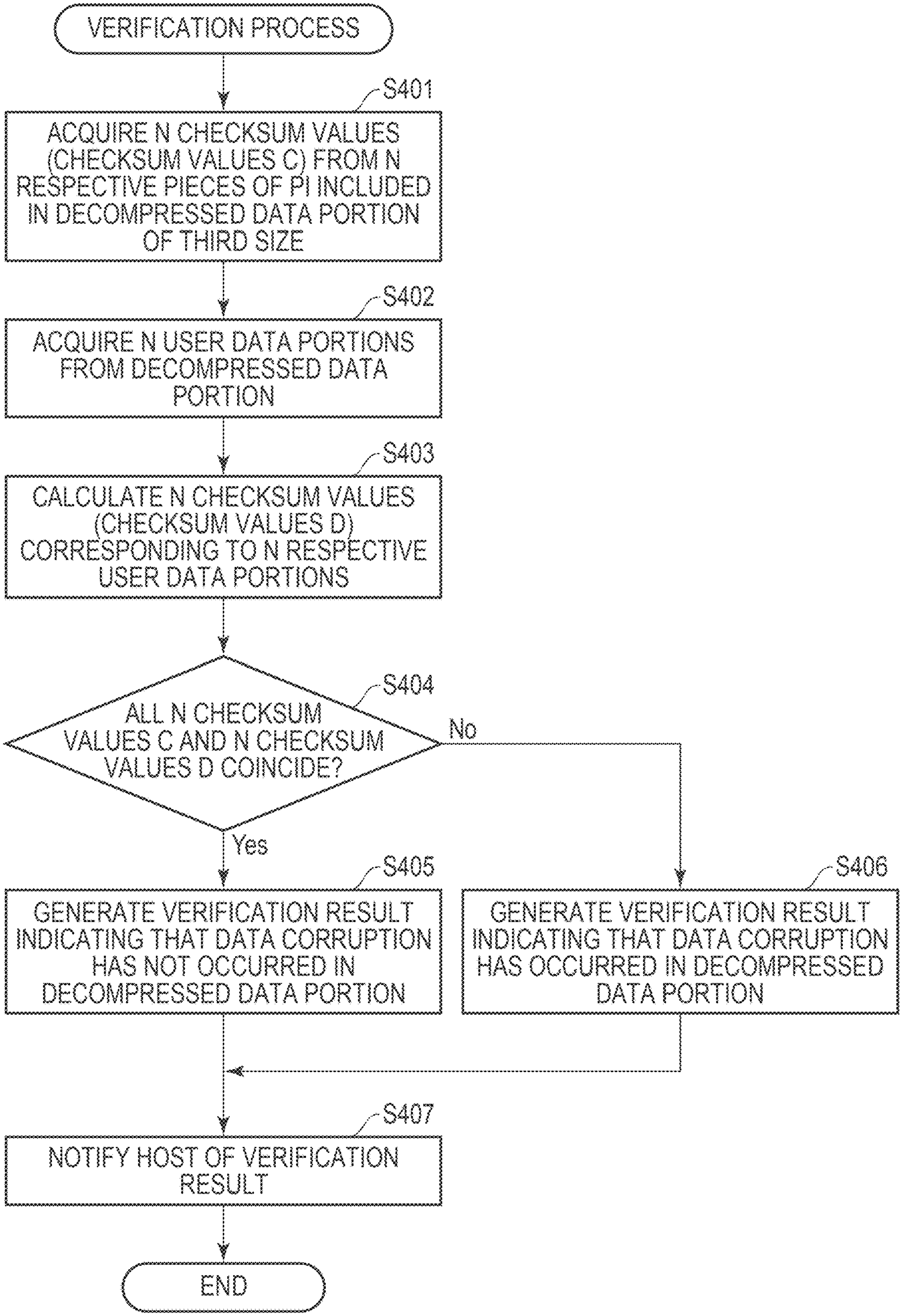
FIG. 12 is a flowchart illustrating an example of the procedure of a verification process executed in the data decompression apparatus of FIG. 10.

FIG. 12 is a flowchart illustrating an example of the procedure of a verification process executed in the data decompression apparatus 15. The verification unit 35 of the data decompression apparatus 15 executes the verification process, for example, in response to receiving a decompressed data portion 622E of the third size from the write control unit 33 (more specifically, the selector 331).

First, the verification unit 35 acquires the N checksum values 721 (hereinafter referred to as the checksum values C) from the N respective pieces of PI 72 included in the decompressed data portion 622E in order from the head (step S401). The checksum value 721 included in one piece of PI 72 is a checksum value (a sector CRC) for the user data portion 71 paired with the piece of PI 72.

Further, the verification unit 35 acquires the N user data portions 71 from the decompressed data portion 622E in order from the head (step S402). Then, the verification unit 35 calculates N checksum values (hereinafter referred to as checksum values D) corresponding to the acquired N respective user data portions 71 (step S403).

Note that the verification unit 35 may perform step S401 after step S402 and step S403, or may perform step S401, step S402, and step S403 in parallel.

Next, the verification unit 35 compares the N checksum values C with the N respective checksum values D in order from the head to determine whether or not the N checksum values C and the N checksum values D all coincide with each other (step S404).

When the N checksum values C and the N checksum values D all coincide with each other (Yes in step S404), the verification unit 35 generates a verification result indicating that data corruption has not occurred in the decompressed data portion 622 (i.e., the N user data portions 71) (step S405), and proceeds to step S407.

When there are checksum values that do not coincide with each other between the N checksum values C and the N checksum values D (No in step S404), the verification unit 35 generates a verification result indicating that data corruption has occurred in the decompressed data portion 622 (step S406), and proceeds to step S407.

Next, the verification unit 35 notifies the host 2 of the integrity verification result of the decompressed data portion 622 (step S407) and ends the verification process. Specifically, the verification unit 35 notifies the host 2 of the verification result, for example, by including the integrity verification result of the decompressed data portion 622 in a response to a request from the host 2 to acquire the decompressed data portion 622.

By using the above verification process, the verification unit 35 uses the N checksum values 721 (sector CRCs) included in the decompressed data portion 622E of the third size received from the write control unit 33 to verify the integrity of the N user data portions 71 included in the decompressed data portion 622. Thereby, together with the decompressed data portion 622 corresponding to the partial decompression position specified in the partial decompression position information 43, the host 2 can acquire an integrity verification result of the decompressed data portion 622.

Note that when M partial decompression positions are specified in the partial decompression position information 43, the verification unit 35 performs the above-described verification process using a decompressed data portion 622E for each of the M decompressed data portions 622 corresponding to those M partial decompression positions. In that case, the verification unit 35 notifies the host 2 of the verification result, for example, by including the integrity verification result of the M decompressed data portions 622 in a response to a request from the host 2 to acquire the M decompressed data portions 622.

The data decompression apparatus 15 illustrated in FIG. 1 has a configuration for efficiently using the bandwidth of the DRAM 5 in the case of acquiring a specific partial area 622 (a decompressed data portion 622) in decompressed data 62 obtained by decompressing compressed data 61. The data decompression apparatus 15 sequentially decompresses the compressed data 61 from the head in order to obtain the specific partial area 622 in the decompressed data 62.

Other cases of obtaining a partial area in data acquired by sequentially processing the data from the head include a case of decrypting encrypted data obtained by using a specific encryption scheme. The specific encryption scheme is, for example, stream cipher.

Figure 13:
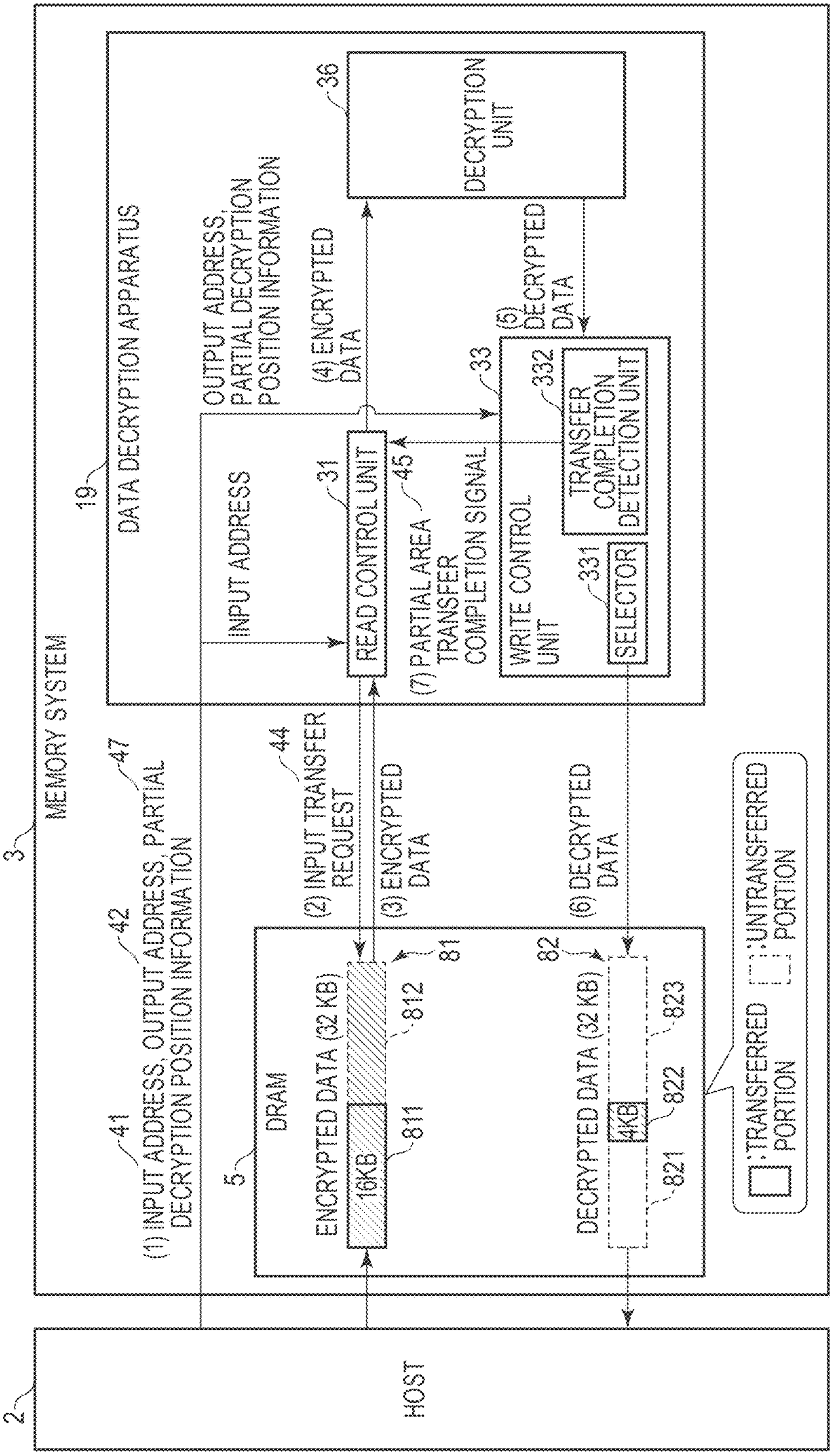
FIG. 13 is a block diagram illustrating an example of the configuration and operation of a data decryption apparatus.

As illustrated in FIG. 13, a data decryption apparatus has a configuration in which the configuration of the data decompression apparatus 15 is applied to decryption of encrypted data obtained by using a specific encryption scheme. That is, the data decryption apparatus has a configuration for efficiently using the bandwidth of the DRAM 5 in the case of acquiring a specific partial area in decrypted data obtained by decrypting encrypted data.

The configuration of the data decryption apparatus of FIG. 13 is similar to that of the data decompression apparatus 15 of FIG. 1, but differ in that compression is replaced with encryption and decompression is replaced with decryption.

FIG. 13 is a block diagram illustrating an example of the configuration and operation of the data decryption apparatus.

A data decryption apparatus 19 is provided, for example, in the controller 6 of the memory system 3 shown in FIG. 1. The data decryption apparatus 19 is a decryptor that decrypts encrypted data 81. The encrypted data 81 is, for example, data transmitted from the host 2 to the memory system 3 or data read from the NAND type flash memory 4. For example, the CPU 11 stores the encrypted data 81 read from the NAND type flash memory 4 in response to receiving a read command from the host 2 in the DRAM 5 (e.g., the first data buffer 51). The data decryption apparatus 19 may read the encrypted data 81 stored in the DRAM 5 and decrypt the read encrypted data 81 to generate decrypted data 82.

The data decryption apparatus 19 decrypts encrypted data 81 for each encryption unit. An encryption unit is a unit of data encrypted at one time. That is, an encryption unit is a unit in which data is encrypted independently of other data.

The data decryption apparatus 19 may acquire information transmitted by the host 2 via the host I/F 14, for example. The information transmitted by the host 2 includes, for example, an input address 41, an output address 42, and partial decryption position information 47.

The input address 41 is the head address of a storage area in the DRAM 5 in which encrypted data 81 is stored. That is, the input address 41 indicates the head address of the first data buffer 51 in the DRAM 5. The encrypted data 81 is stored in the first data buffer 51.

The output address 42 is the head address of a storage area in the DRAM 5 in which a portion of decrypted data 82 obtained by decrypting the encrypted data 81 should be stored. That is, the output address 42 indicates the head address of the second data buffer 52 in the DRAM 5. The decrypted data 82 is data corresponding to data of the encryption unit. In the second data buffer 52, a partial area 822 to be acquired by the host 2 in the decrypted data 82 is stored in order from the head.

The partial decryption position information 47 is information that specifies a partial decryption position to be acquired by the host 2 in the decrypted data 82. One partial decryption position represents one partial area 822 in the decrypted data 82. Hereinafter, the partial area 822 is also referred to as the decrypted data portion 822. Note that the encryption unit and the size of one decrypted data portion 822 (the first size) can be set in any manner.

The configuration of decrypted data 82 for specifying a partial decrypting position corresponds to a configuration in which compression is replaced with encryption and decompression is replaced with decryption in the configuration of decompressed data 62 for specifying a partial decompression position described above with reference to FIG. 4, for example. Further, a specific example of the partial decryption position information 47 is similar to the example of the partial decompression position information 43 described above with reference to FIG. 5, and decompression is replaced with decryption.

The data decryption apparatus 19 is configured to read data from the DRAM 5 and write data to the DRAM 5 via the DRAM I/F 13, for example. That is, the data decryption apparatus 19 is configured to control data transfer from the DRAM 5 and data transfer to the DRAM 5. Furthermore, the data decryption apparatus 19 is configured to decrypt encrypted data 81 read from the DRAM 5 in order from the head to generate decrypted data 82 in order from the head. When a decrypted data portion 822 to be acquired in the decrypted data 82 is specified in the partial decryption position information 47, the data decryption apparatus 19 performs control so that the transfer of the encrypted data 81 from the DRAM 5 to the data decryption apparatus 19 is stopped in response to the completion of transfer of the decrypted data portion 822 to be acquired to the DRAM 5.

The data decryption apparatus 19 includes, for example, the read control unit 31, a decryption unit 36, and the write control unit 33. Components in the data decryption apparatus 19 such as the read control unit 31, the decryption unit 36, and the write control unit 33 are implemented by at least one of, for example, a register, a memory, an adder, a multiplier, a selector, and other arithmetic units.

The read control unit 31 is a circuit that controls the reading (transfer) of encrypted data 81 from the DRAM 5. The read control unit 31 reads encrypted data 81 from the DRAM 5 in order from the head, and sequentially outputs the read encrypted data 81 to the decryption unit 36.

The decryption unit 36 is a circuit that sequentially decrypts the encrypted data 81 received from the read control unit 31 to generate decrypted data 82. The decryption unit 36 generates the decrypted data 82 obtained by decrypting the encrypted data 81 in order from the head. The decryption unit 36 sequentially outputs the generated decrypted data 82 to the write control unit 33.

The write control unit 33 is a circuit that controls the writing (transferring) of decrypted data 82 output by the decryption unit 36 to the DRAM 5 and the output of the partial area transfer completion signal 45 to the read control unit 31. The partial area transfer completion signal 45 is a signal that causes the read control unit 31 to stop reading encrypted data 81 from the DRAM 5.

The write control unit 33 includes, for example, the selector 331 and the transfer completion detection unit 332. The selector 331 selectively writes only the decrypted data portion 822 specified by the host 2 in the decrypted data 82 output by the decryption unit 36 to the DRAM 5. The transfer completion detection unit 332 outputs the partial area transfer completion signal 45 to the read control unit 31 in response to the completion of writing of all the decrypted data portions 822 specified by the host 2 to the DRAM 5.

Here, the encryption scheme used in the data decryption apparatus 19 will be described.

Figure 14:
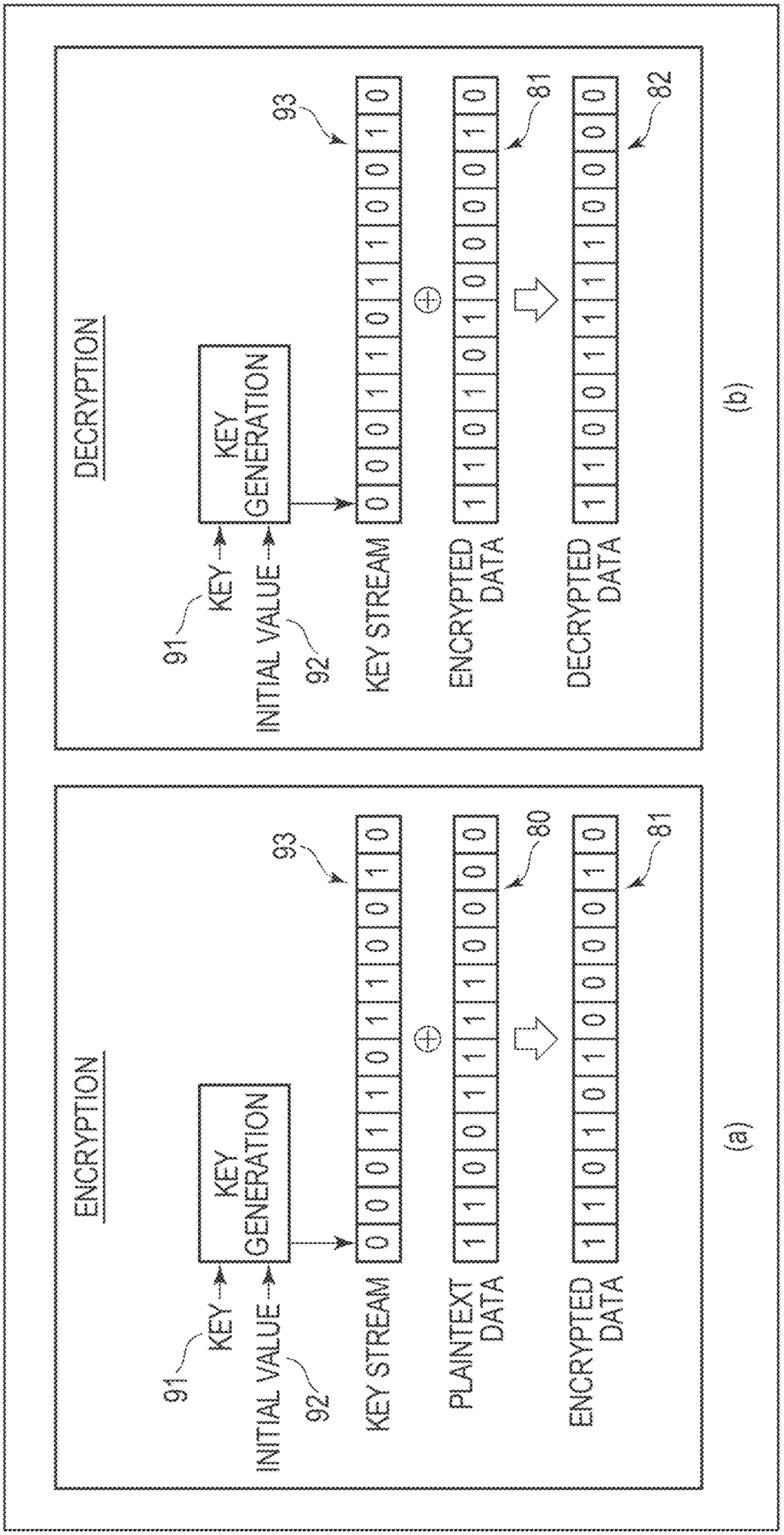
FIG. 14 shows diagrams illustrating: (a) an example of encryption of plaintext data; and (b) an example of decryption of encrypted data in an encryption scheme used in the data decryption apparatus of FIG. 13.

FIG. 14 shows (a) an example of encryption of plaintext data and (b) an example of decryption of encrypted data 81 in the encryption scheme used in the data decryption apparatus 19. Here, a case where the encryption scheme used in the data decryption apparatus 19 is stream cipher will be described as an example. Note that the encryption scheme may be other schemes for sequentially processing data from the head.

As shown in the part (a) of FIG. 14, in stream cipher, when plaintext data 80 is encrypted, a key stream 93 having the same length as the plaintext data 80 is generated. The key stream 93 is generated using a key 91 and an initial value 92 in the initial state (i.e., the initial internal state). The next value (the next generation unit) of the key stream 93 is generated based on the next internal state to which the internal state is transitioned using a specific function. Note that the initial state is determined based on the key 91 and the initial value 92.

Then, by performing an exclusive OR operation between the generated key stream 93 and the plaintext data 80, encrypted data 81 is generated. The encrypted data 81 has basically the same length as the plaintext data 80.

Further, as shown in the part (b) of FIG. 14, when the encrypted data 81 is decrypted, a key stream 93 having the same length as the encrypted data 81 is generated. In the initial state, the key stream 93 is generated using the same key 91 and initial value 92 as at the time of encryption. The next value of the key stream 93 is generated based on the next internal state to which the internal state is transitioned using the specific function. Thus, by using the same key 91 and initial value 92 as at the time of encryption and the same key generation method, the key stream 93 used for encrypting the plaintext data 80 can be acquired.

Then, by performing an exclusive OR operation between the generated key stream 93 and the encrypted data 81, decrypted data 82 is generated. When the process from encryption to decryption is performed without error, decrypted data 82 that is the same as the plaintext data 80 can be acquired. The decrypted data 82 basically has the same length as the encrypted data 81.

Thus, in stream cipher, the key stream 93 is generated in order from the first value using the key 91 and the initial value 92. Therefore, the data decryption apparatus 19 using stream cipher sequentially decrypts encrypted data 81 from the head in order to obtain a specific partial area 822 (a decrypted data portion 822) in decrypted data 82. Therefore, similar to the data decompression apparatus 15 of FIG. 1, the data decryption apparatus 19 has a configuration for efficiently using the bandwidth of the DRAM 5 in the case of acquiring a specific partial area 822 in decrypted data 82 obtained by decrypting encrypted data 81.

Returning to FIG. 13, the operation of the read control unit 31, the decryption unit 36, and the write control unit 33 will be described more specifically. In the following, a case where the encryption unit is 32 KB and the size of one decrypted data portion (the first size) is 4 KB will mainly be described as an example. 32 KB encrypted data 81 is stored in the DRAM 5. The 32 KB encrypted data 81 is data obtained by encrypting plaintext data 80 of the encryption unit (32 KB). Decrypted data 82 obtained when the entire 32 KB encrypted data 81 is decrypted is 32 KB data. That is, the encrypted data 81 and the decrypted data 82 have, for example, the same size. The 32 KB decrypted data 82 includes eight 4 KB decrypted data portions. Thus, these eight 4 KB decrypted data portions are identified, for example, by eight respective partial decryption positions indicated by the numbers 0 to 7. Here, it is assumed that the partial decryption position information 47 specifies the decrypted data portion 822 corresponding to the fourth partial decompression position of the eight partial decryption positions.

The read control unit 31 and the write control unit 33 receive the input address 41, the output address 42, and the partial decryption position information 47 transmitted by the host 2 ((1) in FIG. 13). Specifically, the read control unit 31 receives the input address 41. Further, the write control unit 33 receives the output address 42 and the partial decryption position information 47.

The read control unit 31 transmits an input transfer request 44 to the DRAM 5 in order to read the encrypted data 81 stored in the storage area (the first data buffer 51) starting from the input address 41 in the DRAM 5 in order from the head, for example, for each second size ((2) in FIG. 13). The input transfer request 44 is a request to cause the DRAM 5 to transfer a data portion of the second size included in the encrypted data 81 (hereinafter also referred to as an encrypted data portion) to the read control unit 31. The second size may be smaller than the encryption unit and may also be smaller than the first size. The second size is a size configurable in any manner, such as 512 B or 1 KB. The input transfer request 44 specifies, for example, the head address and size of a storage area in which an encrypted data portion to be transferred is stored. For example, the input transfer request 44 first transmitted by the read control unit 31 to the DRAM 5 in order to read the encrypted data 81 specifies the input address 41 and the second size.

The read control unit 31 receives the encrypted data portion read in response to the transmitted input transfer request 44 from the DRAM 5 ((3) in FIG. 13). Then, the read control unit 31 outputs the received encrypted data portion to the decryption unit 36 ((4) in FIG. 13).

The decryption unit 36 decrypts the encrypted data portion received from the read control unit 31 to generate decrypted data, and outputs the generated decrypted data to the write control unit 33 ((5) in FIG. 13). The decryption unit 36 decrypts the encrypted data portion that is a portion of the encrypted data 81 in order from the head to generate decrypted data 82 in order from the head.

The selector 331 of the write control unit 33 writes only the decrypted data portion 822 corresponding to the partial decryption position specified in the partial decryption position information 47 in the decrypted data output by the decryption unit 36 to the storage area (the second data buffer 52) starting from the output address 42 in the DRAM 5 based on the partial decryption position information 47 and the output address 42 ((6) in FIG. 13). Specifically, the selector 331 does not write, to the DRAM 5, the 12 KB decrypted data portion 821 corresponding to the partial decryption positions (in FIG. 13, the first to third partial decryption positions) that are not specified in the partial decryption position information 47 in the decrypted data output by the decryption unit 36. Then, the selector 331 writes, to the DRAM 5, the 4 KB decrypted data portion 822 corresponding to the partial decryption position (in FIG. 3, the fourth partial decryption position) specified in the partial decryption position information 47 in the decrypted data output by the decryption unit 36. In FIG. 13, the decrypted data portion 822 written to the DRAM 5 (a transferred portion) is shown by a solid line, and the decrypted data portions 821 and 823 not written to the DRAM 5 (untransferred portions) are shown by a dashed line.

Further, the transfer completion detection unit 332 outputs the partial area transfer completion signal 45 to the read control unit 31 in response to the completion of writing of the decrypted data portions corresponding to all partial decryption positions specified in the partial decryption position information 47 to the DRAM 5 ((7) in FIG. 13). Specifically, the transfer completion detection unit 332 outputs the partial area transfer completion signal 45 to the read control unit 31 in response to the completion of writing of the decrypted data portion 822 to the DRAM 5. Note that the transfer completion detection unit 332 may output the partial area transfer completion signal 45 to the read control unit 31 in response to the detection of the decrypted data portions (in FIG. 13, the decrypted data portions 822) corresponding to all partial decryption positions specified in the partial decryption position information 47 from the decrypted data output by the decryption unit 36.

The read control unit 31 performs control so as to stop reading the encrypted data 81 from the DRAM 5 in response to receiving the partial area transfer completion signal 45 from the transfer completion detection unit 332. Specifically, the read control unit 31 stops transmitting the input transfer request 44 to the DRAM 5. Note that the read control unit 31 may receive an encrypted data portion transferred from the DRAM 5 in response to the already-transmitted input transfer request 44. This is because if the read control unit 31 does not receive the encrypted data portion transferred from the DRAM 5, the configuration related to data transfer such as the DRAM I/F 13 and the bus 10 may be locked. The read control unit 31 discards the received encrypted data portion without outputting it to the decryption unit 36, for example.

For example, after the partial area transfer completion signal 45 is output from the transfer completion detection unit 332, the host 2 performs control so that the decrypted data portion 822 is read from the second data buffer 52 in the DRAM 5 and transferred to the host 2. This enables the host 2 to acquire the decrypted data portion 822 specified in the partial decryption position information 47.

In the example shown in FIG. 13, when the read control unit 31 reads 16 KB encrypted data portion 811 from the head of the encrypted data 81 and the decryption unit 36 decrypts the 16 KB encrypted data portion 811, the decrypted data portion 821 and the decrypted data portion 822 are output from the decryption unit 36 to the write control unit 33. In response to the output of the decrypted data portion 822, the selector 331 writes the decrypted data portion 822 to the DRAM 5, and the transfer completion detection unit 332 outputs the partial area transfer completion signal 45 to the read control unit 31. Then, the read control unit 31 performs control so as to stop reading the encrypted data 81 from the DRAM 5 in response to the partial area transfer completion signal 45.

As a result, for example, 16 KB encrypted data portion 812 in the second half of the encrypted data 81 is not read from the DRAM 5. In FIG. 13, the encrypted data portion 811 read from the DRAM 5 (a transferred portion) is shown by a solid line, and the encrypted data portion 812 not read from the DRAM 5 (an untransferred portion) is shown by a dashed line.

Since the 16 KB encrypted data portion 812 is not read from the DRAM 5, the 16 KB decrypted data portion 823 obtained by decrypting the encrypted data portion 812 is not generated by decryption or written to the DRAM 5.

Thus, when the partial decryption position information 47 specifies, for example, the decrypted data portion 822 corresponding to the fourth partial decompression position of the eight partial decryption positions, the 4 KB decrypted data portion 822 is transferred from the data decryption apparatus 19 to the DRAM 5, and the 16 KB encrypted data portion 811 in the first half of the 32 KB encrypted data 81 is transferred from the DRAM 5 to the data decryption apparatus 19 on average. This enables the data decryption apparatus 19 to reduce the total data transfer amount between the data decryption apparatus 19 and the DRAM 5 to about 20 KB (=4 KB+16 KB). For example, the total data transfer amount is 36 KB in a case where the entire 32 KB encrypted data 81 and the 4 KB decrypted data portion 822 to be acquired are transferred between the data decryption apparatus and the DRAM, as with the data decompression apparatus 15C of the comparative example shown in the part (b) of FIG. 2. The data decryption apparatus 19 of FIG. 13 can reduce the total data transfer amount to about 56% compared to this case.

Therefore, the data decryption apparatus 19 can efficiently use the bandwidth of the DRAM 5 in the case of acquiring a portion of decrypted data 82 obtained by decrypting encrypted data 81. Furthermore, the data decryption apparatus 19 can reduce the latency in decryption process performed by the decryption unit 36 on average by not decrypting the entire encrypted data 81.

Note that the processes executed by the data decryption apparatus 19 correspond to process in which compression is replaced with encryption and decompression is replaced with decryption in the read control process described above with reference to FIG. 6 and the write control process described above with reference to FIG. 7.

As described above, it is possible to efficiently use the bandwidth of a RAM in decompressing compressed data or decrypting encrypted data.

In response to receiving the input address 41 from the host 2, the read control unit 31 causes compressed data 61 stored in the first storage area (e.g., the first data buffer 51) starting from the input address 41 in the RAM (e.g., the DRAM 5) to be transferred to the data decompression apparatus 15. The decompression unit 32 decompresses the transferred compressed data in order from the head to generate decompressed data. The write control unit 33 receives partial decompression position information 43 specifying one or more decompressed data portions 622 (i.e., partial decompression positions) to be stored in the RAM in the generated decompressed data 62 and the output address 42 from the host 2. The selector 331 of the write control unit 33 transfers the one or more decompressed data portions 622 specified in the partial decompression position information 43 to the second storage area (e.g., the second data buffer 52) starting from the output address 42 in the RAM. The transfer completion detection unit 332 of the write control unit 33 outputs the partial area transfer completion signal 45 indicating that the transfer of the one or more decompressed data portions 622 has been completed to the read control unit 31. The read control unit 31 performs control so as to stop reading the compressed data 61 stored in the first storage area in response to receiving the partial area transfer completion signal 45.

This enables the data decompression apparatus 15 to reduce the data transfer amount between the data decompression apparatus 15 and the RAM to a transfer amount corresponding to one or more decompressed data portions 622 and a portion of compressed data 61 transferred until the one or more decompressed data portions 622 are acquired. Therefore, the data decompression apparatus 15 can efficiently use the bandwidth of the RAM in the case of acquiring a portion of decompressed data 62 obtained by decompressing compressed data 61.

The configuration of the data decompression apparatus 15 described above can also be applied to the data decryption apparatus 19 using an encryption scheme that sequentially encrypts data from the head, such as stream cipher. Therefore, the data decryption apparatus 19 can efficiently use the bandwidth of the RAM in the case of acquiring a portion of decrypted data 82 obtained by decrypting encrypted data 81.

Each of the various functions described in the disclosure may be implemented by a circuit (a processing circuit). Examples of processing circuits include a programmed processor, such as a central processing unit (CPU). This processor executes each of the described functions by executing a computer program (a set of instructions) stored in a memory. This processor may be a microprocessor that includes an electrical circuit. Examples of processing circuits also include a digital signal processor (DSP), an application-specific integrated circuit (ASIC), a microcontroller, a controller, and other electrical circuit components. Each of the other components than the CPU described in the embodiments may also be implemented by a processing circuit.

While certain embodiments have been described, these embodiments have been presented by way of example only, and are not intended to limit the scope of the disclosure. Indeed, the novel devices and methods described herein may be embodied in a variety of other forms; furthermore, various omissions, substitutions and changes in the form of the embodiments described herein may be made without departing from the spirit of the disclosure. The accompanying claims and their equivalents are intended to cover such forms or modification as would fall within the scope and spirit of the disclosure.

What is claimed is:

1. A data decompression apparatus, comprising:

a read control circuit configured to, in response to receiving a first address from a host, read compressed data, stored in a first storage area, starting from the first address in a random access memory;

a decompression circuit configured to decompress the compressed data in an order from a head to generate decompressed data; and a write control circuit configured to, in response to receiving (i) first information specifying one or more data portions, to be stored in the random access memory, in the decompressed data and (ii) a second address from the host:

transfer the one or more data portions, specified in the first information, to a second storage area, starting from the second address, in the random access memory, and output, to the read control circuit, a signal indicating that transfer of the one or more data portions has been completed, wherein in response to the signal output from the write control circuit, the read control circuit performs control to stop reading the compressed data stored in the first storage area.

2. The data decompression apparatus of claim 1, wherein each of the one or more data portions has a first size, the decompressed data, obtained by decompressing the compressed data stored in the first storage area, includes a plurality of data portions of the first size, and the first information specifies a number indicating a position of each of the one or more data portions of the plurality of data portions of the first size.

3. The data decompression apparatus of claim 1, wherein each of the one or more data portions has a first size, the decompressed data, obtained by decompressing the compressed data stored in the first storage area, includes a plurality of data portions of the first size, and the first information specifies whether or not each of the plurality of data portions of the first size is a data portion to be stored in the random access memory.

4. The data decompression apparatus of claim 1, wherein the write control circuit is further configured to output the signal to the read control circuit in response to completion of transfer of the one or more data portions to the second storage area.

5. The data decompression apparatus of claim 1, wherein the read control circuit is further configured to transmit, in response to receiving the first address, a transfer request, to the random access memory, for the compressed data, stored in the first storage area, to be transferred in the order from the head for each second size, and stop transmission of the transfer request to the random access memory in response to the signal.

6. The data decompression apparatus of claim 5, wherein each of the second sizes is smaller than a size of each of the one or more data portions.

7. The data decompression apparatus of claim 1, further comprising a verification circuit configured to receive one or more first checksum values corresponding to a respective data portion of the one or more data portions from the host, calculate one or more second checksum values corresponding to the respective data portion of the one or more data portions included in the decompressed data, and notify the host of a result of comparing (i) the one or more first checksum values corresponding to the respective data portion of the one or more data portions with (ii) the one or more second checksum values corresponding to the respective data portion of the one or more data portions.

8. The data decompression apparatus of claim 7, wherein the verification circuit receives, from the host, second information including the one or more first checksum values corresponding to the respective data portion of the one or more data portions.

9. The data decompression apparatus of claim 7, wherein the host includes a second random access memory, and the verification circuit is configured to receive, from the host, second information indicating a storage area in the second random access memory, in which the one or more first checksum values corresponding to the respective data portion of the one or more data portions are stored, and transfer the one or more first checksum values from the second random access memory based on the second information.

10. The data decompression apparatus of claim 1, wherein each of the one or more data portions has a third size, a first data portion of the one or more data portions included in the decompressed data includes a plurality of second data portions of a fourth size smaller than the third size, each of the plurality of second data portions includes user data and a third checksum value for the user data, and the data decompression apparatus further comprises a verification circuit configured to acquire a plurality of the third checksum values from the plurality of second data portions, acquire a plurality of the user data included in the plurality of second data portions, calculate a plurality of fourth checksum values corresponding to the plurality of the user data, and notify the host of a result of comparing the plurality of third checksum values with the plurality of fourth checksum values.

11. A memory system, comprising:

the data decompression apparatus of claim 1;

the random access memory;

a non-volatile memory; and a control circuit that is electrically connected to the non-volatile memory, the control circuit configured to read the compressed data from the non-volatile memory, and store the compressed data in the first storage area in the random access memory.

12. An information processing system comprising:

the host; and the memory system of claim 11.

13. A data decryption apparatus, comprising:

a read control circuit configured to, in response to receiving a first address from a host, read encrypted data, stored in a first storage area, starting from the first address in a random access memory;

a decryption circuit configured to decrypt the encrypted data in an order from a head to generate decrypted data; and a write control circuit configured to, in response to receiving (i) first information specifying one or more data portions, to be stored in the random access memory, in the decrypted data and (ii) a second address from the host:

transfer the one or more data portions, specified in the first information, to a second storage area, starting from the second address, in the random access memory, and output, to the read control circuit, a signal indicating that transfer of the one or more data portions has been completed, wherein in response to the signal output from the write control circuit, the read control circuit performs control to stop reading the encrypted data stored in the first storage area.

14. The data decryption apparatus of claim 13, wherein each of the one or more data portions has a first size, the decrypted data, obtained by decrypting the encrypted data stored in the first storage area, includes a plurality of data portions of the first size, and the first information specifies a number indicating a position of each of the one or more data portions of the plurality of data portions of the first size.

15. The data decryption apparatus of claim 13, wherein each of the one or more data portions has a first size, the decrypted data, obtained by decrypting the encrypted data stored in the first storage area, includes a plurality of data portions of the first size, and the first information specifies whether or not each of the plurality of data portions of the first size is a data portion to be stored in the random access memory.

16. The data decryption apparatus of claim 13, wherein the write control circuit is further configured to output the signal to the read control circuit in response to completion of transfer of the one or more data portions to the second storage area.

17. The data decryption apparatus of claim 13, wherein the read control circuit is further configured to transmit, in response to receiving the first address, a transfer request, to the random access memory, for the encrypted data, stored in the first storage area, to be transferred in the order from the head for each second size, and stop transmission of the transfer request to the random access memory in response to the signal.

18. The data decryption apparatus of claim 17, wherein each of the second sizes is smaller than a size of each of the one or more data portions.

19. A memory system comprising:

the data decryption apparatus of claim 13;

the random access memory;

a non-volatile memory; and a control circuit that is electrically connected to the non-volatile memory, the control circuit configured to read the encrypted data from the non-volatile memory, and store the encrypted data in the first storage area in the random access memory.

20. An information processing system comprising:

the host; and the memory system of claim 19.

* * * * *